US009818045B2

United States Patent
Kern et al.

(10) Patent No.: US 9,818,045 B2
(45) Date of Patent: Nov. 14, 2017

(54) APPARATUS AND METHOD FOR DETECTING A FEATURE IN AN IMAGE

(71) Applicant: Apple Inc., Cupertino, CA (US)

(72) Inventors: Lorenz Kern, Sunnyvale, CA (US); Norbert Stoeffler, Graefelfing (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/617,826

(22) Filed: Jun. 8, 2017

(65) Prior Publication Data

US 2017/0277974 A1 Sep. 28, 2017

Related U.S. Application Data

(63) Continuation of application No. 14/843,724, filed on Sep. 2, 2015, now Pat. No. 9,679,222.

(30) Foreign Application Priority Data

Sep. 3, 2014 (EP) .................................... 14183448

(51) Int. Cl.
G06K 9/62 (2006.01)
G06K 9/52 (2006.01)
(Continued)

(52) U.S. Cl.
CPC ....... G06K 9/6212 (2013.01); G06K 9/00986 (2013.01); G06K 9/4604 (2013.01); G06K 9/4671 (2013.01); G06K 9/52 (2013.01)

(58) Field of Classification Search
CPC ...... G06K 9/4604; G06K 9/4671; G06K 9/52; G06K 9/00986; G06K 9/6212
(Continued)

(56) References Cited

U.S. PATENT DOCUMENTS 9,117,144 B2 8/2015 Hamsici

FOREIGN PATENT DOCUMENTS

WO 2013071981 A1 5/2013

OTHER PUBLICATIONS

Bailey, D., "Design for Embedded Image Processing on FPGAs," Wiley, 2011.

(Continued)

Primary Examiner — Daniel Mariam
(74) Attorney, Agent, or Firm — Blank Rome LLP

(57) ABSTRACT

An apparatus for detecting a feature in an image includes an image input section for receiving at least part of the image in the form of image data having a plurality of pixels, the plurality of pixels comprising a plurality of non-border pixels, a feature detection module adapted to attribute a feature probability value to each of the pixels of the image data, and an extremum determination module for determining at least one local extremum among the feature probability values, wherein the extremum determination module is adapted to output, for each of the plurality of pixels, a final indication if the feature probability value of the pixel in question is a local extremum. The extremum determination module is adapted to use, for each of the plurality of non-border pixels, comparison results of at least two comparison operations, with each comparison operation including a comparison of the feature probability value of the non-border pixel in question with the feature probability values of a respective subset of neighboring pixels, with the respective subsets of neighboring pixels being different subsets.

24 Claims, 17 Drawing Sheets

(51) Int. Cl.
*G06K 9/46* (2006.01)
*G06K 9/00* (2006.01)

(58) Field of Classification Search
USPC .................................................. 382/199, 218
See application file for complete search history.

(56) References Cited

OTHER PUBLICATIONS

Bonato V., et al., "A Parallel Hardware Architecture for Scale and Rotation Invariant Feature Detection," IEEE Transactions on Circuits and Systems for Video Technology, IEEE Service Center, Piscataway, NJ, US, vol. 18, No. 12, Dec. 1, 2008 (Dec. 1, 2008), pp. 1703-1712, XP011238329, ISSN: 1051-8215, DOI: 10.1109/TCSVT.2008.2004936.

Chang, Leonard, et al., "FPGA-based detection of SIFT interest keypoints," Machine Vision and Applications, vol. 24, No. 2, May 30, 2012 (May 30, 2012), pp. 371-392, XP055161908, ISSN: 0932-8092, DOI: 10.1007/s00138-012-0430-E.

Jing Zhang, et al., "Overview of approaches for accelerating scale invariant feature detection algorithm," International conference on Electronic Information and Control Engineering (ICEICE), 2011, IEEE, Apr. 15, 2011, (Apr. 15, 2011), pp. 585-589, XP031875297, DOI: 10.1109/ICEICE.2011.5778312, ISBN: 978-1-4244-8036-4.

Lu, C. & Fu, L., "Hardware architecture to realize multi-layer image processing in real-time," 33rd Annual Conference of the IEEE Industrial Electronics Society, 2007, IECON 2007, 2478-2483.

Neubeck, Alexander, and Luc Van Gool, "Efficient non-maximum suppression," 18th International Conference on Pattern Recognition, 2006, ICPR 2006, vol. 3. IEEE Rao, Daggu Venkateshwar, et al., "Implementation and evaluation of image processing algorithms on reconfigurable architecture using C-based hardware descriptive languages," International Journal of Theoretical and Applied computer Sciences 1.1 (2006): 9-34.

Tuan Q Pham Ed—Jacques Blanc-Talon, et al., "Non-Maximum Suppression Using Fewer than Two Comparisons per Pixel," Dec. 13, 2010 (Dec. 13, 2010), Advanced Concepts for Intelligent Vision Systems, Springer Berlin Heidelberg, pp. 438-451, XP019159146, ISBN: 978-3-642-17687-6.

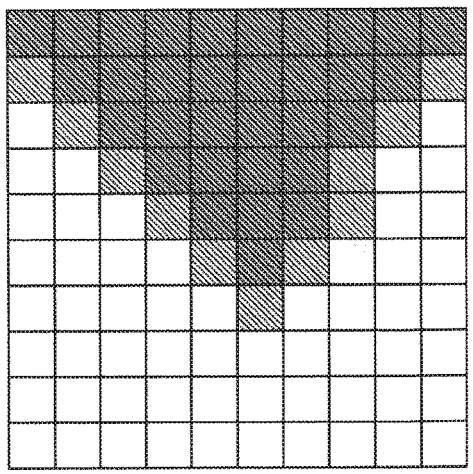

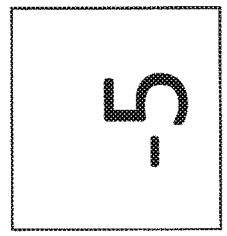
Fig 2A
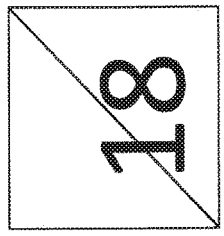
Fig 2B
Fig 2C

Fig 3A

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | -187 | -52 | -1 | 4 | -7 | -81 | 0 | 0 |
| 0 | 0 | -260 | -152 | -14 | 33 | -51 | -165 | 0 | 0 |
| 0 | 0 | -167 | -218 | 39 | 291 | -37 | -179 | 0 | 0 |
| 0 | 0 | -53 | -136 | 169 | 575 | 93 | -93 | 0 | 0 |
| 0 | 0 | -6 | -47 | 110 | 396 | 66 | -24 | 0 | 0 |
| 0 | 0 | 0 | -4 | 18 | 69 | 12 | -2 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

3001

Fig 3B (same matrix)

Fig 3C (same matrix)

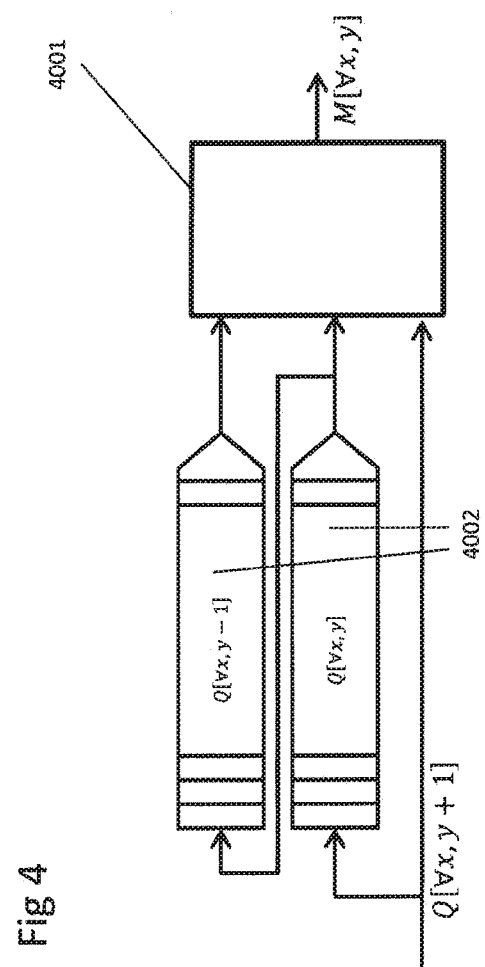

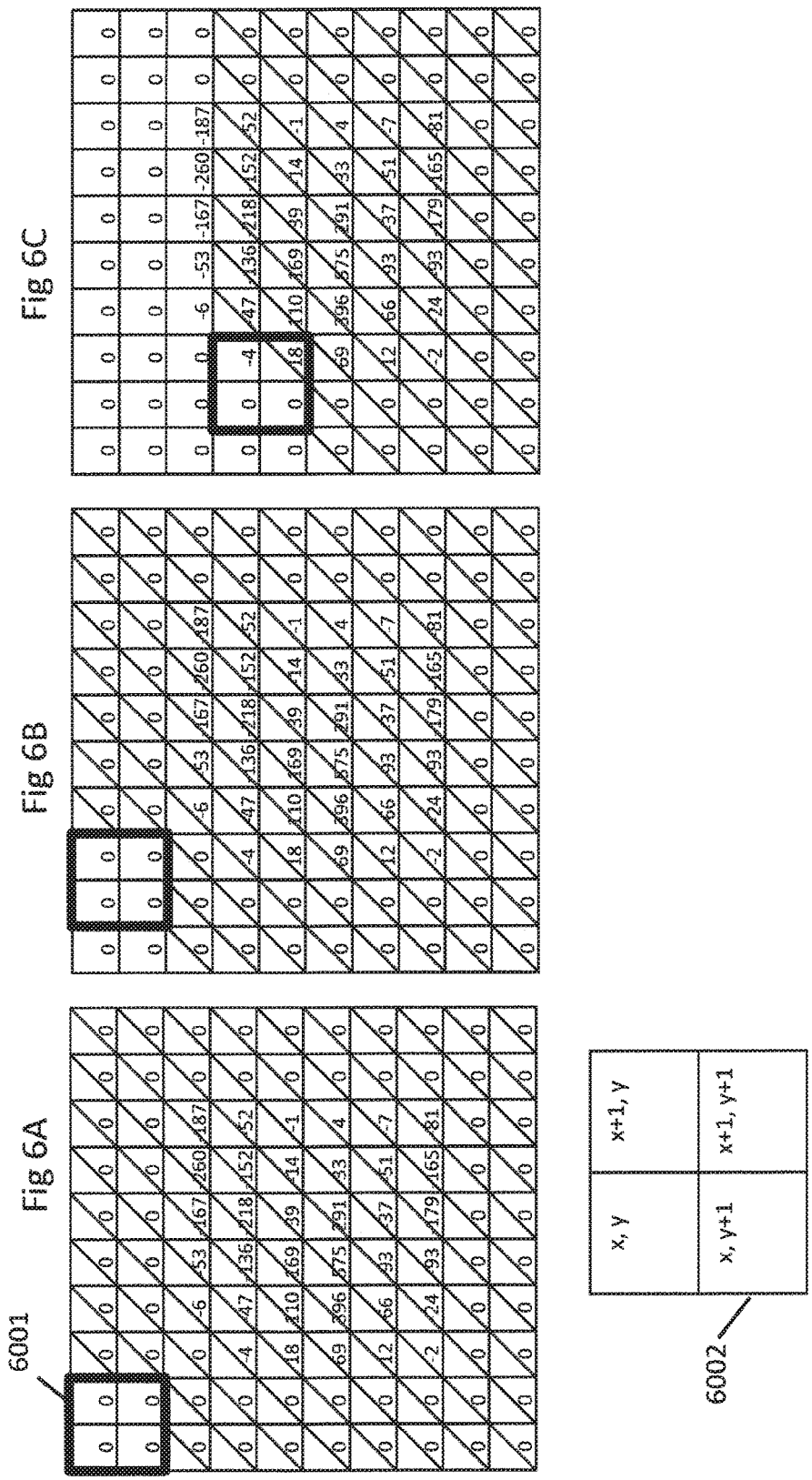

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | -167 | -260 | -187 | -52 | -1 | 4 | -7 | 0 |
| 0 | 0 | -167 | -260 | -218 | -152 | -14 | 33 | 51 | -465 | 0 |
| 0 | 0 | -53 | -136 | 39 | 169 | 291 | 37 | 479 | 0 |
| 0 | 0 | -47 | 110 | 396 | 675 | 93 | -93 | 0 |
| 0 | 0 | -6 | -47 | 110 | 396 | 66 | -24 | 0 |
| 0 | 0 | 0 | -4 | 18 | 69 | 12 | -2 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

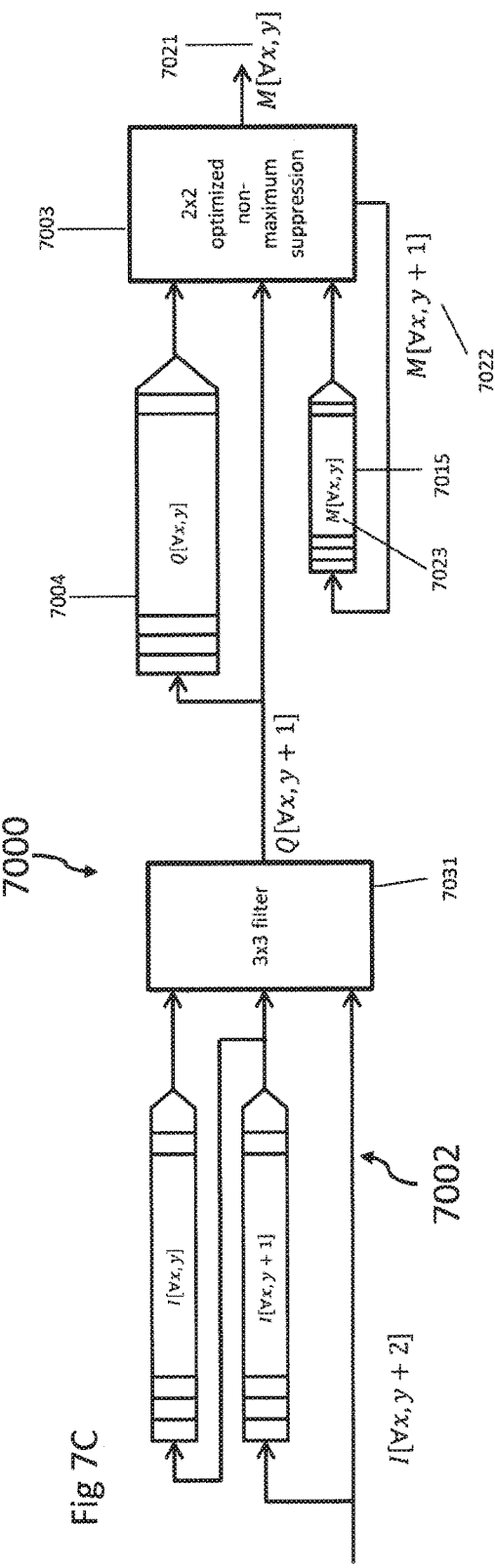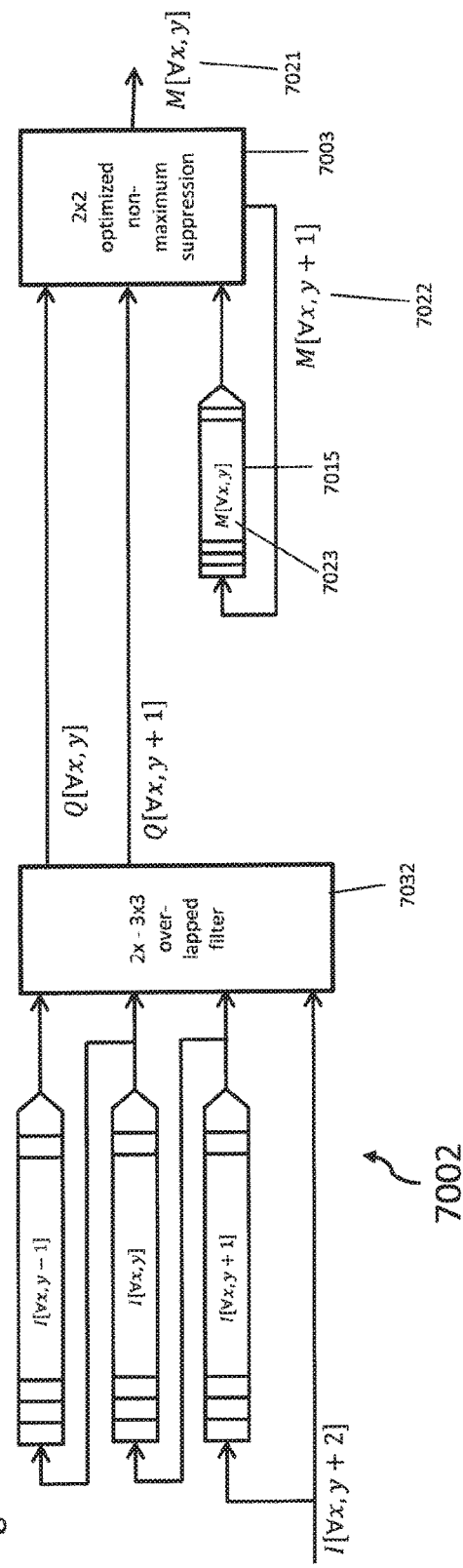

APPARATUS AND METHOD FOR DETECTING A FEATURE IN AN IMAGE

CROSS-REFERENCE TO RELATED APPLICATIONS

This application is a continuation of U.S. patent application Ser. No. 14/843,724, entitled "Apparatus And Method For Detecting A Feature In An Image," filed Sep. 2, 2015, which claims priority to European Patent Application No. 14183448.1 filed Sep. 3, 2014, entitled "Apparatus and Method for Detecting a Feature in an Image," both of which are incorporated herein by reference in their entireties.

BACKGROUND

The present invention relates to an apparatus for detecting a feature in an image and a method of detecting a feature in an image. In particular, the present invention relates to hardware implementations of feature detection in images.

Feature detection in an image is a known field. Common feature detectors calculate a certain pixel value Q[x,y] for each pixel of an image I[x,y]. The value Q[x,y] denotes the probability that the pixel [x,y] is a feature. The value is therefore also referred to as the feature probability value. The parameters x and y represent the location of the pixel in the image coordinate system.

SUMMARY

The feature detection step in a typical object recognition pipeline may be as follows. In the last step of the pipeline, features are compared to a database of already known features. For every detected feature, a descriptor is calculated. This descriptor is compared to the descriptors of all features in the database. During the comparison, a similarity measure is calculated. The similarity measure can be comprised of similarities of individual partitions of the descriptors. The feature with the highest similarity is considered to be a "match". These similarity measures can be calculated very effectively by proposed hardware solutions disclosed in WO2013071981A1 because of the intrinsic parallelism of the task.

BRIEF DESCRIPTION OF THE DRAWINGS

Exemplary embodiments of the invention are described in greater detail below with respect to the Figures.

FIGS. 1A-1D show a general method of finding a local maximum among feature probability values associated with the pixels of an image.

FIGS. 2A-2C show a legend for the local maximum detection depicted throughout the Figures.

FIGS. 3A-3F show various steps of a prior art approach for finding a local maximum among the feature probability values of the image.

FIG. 4 shows a prior art implementation of a non-maximum suppression filter and associated line buffers.

FIGS. 6A-6L show various steps of an exemplary approach for finding a local maximum among the feature probability values of the image in accordance with the invention.

FIGS. 7A-7D show exemplary embodiments of an apparatus for detecting a feature in an image in accordance with the invention.

DESCRIPTION

Figure 5:
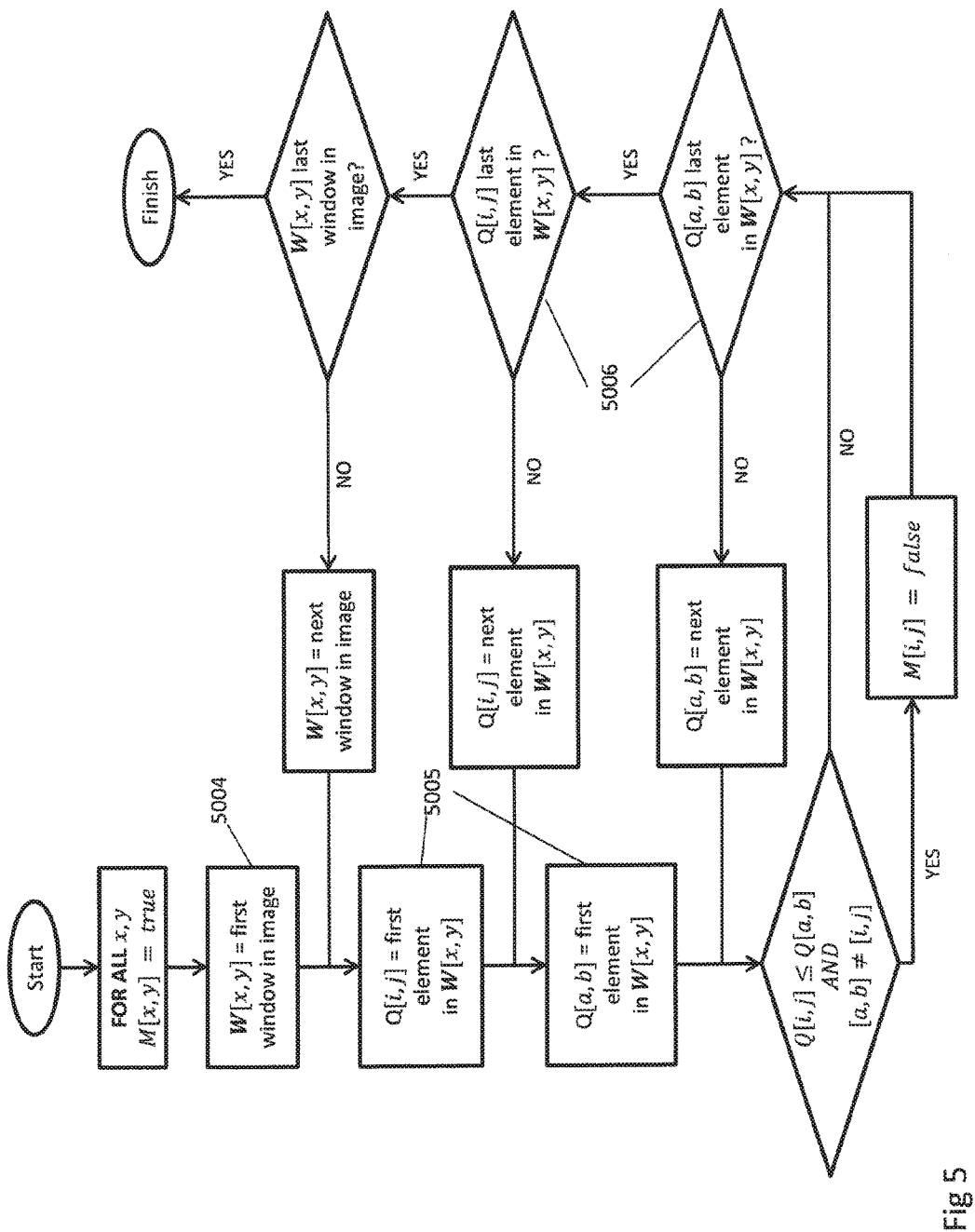
FIG. 5 shows a flow diagram of an exemplary method for detecting a feature in an image in accordance with an embodiment of the invention.

Exemplary feature detection methods are explained with respect to FIG. 1. In FIG. 1A, a grey-scale image of 10×10 pixels is depicted, which shows a corner. The corner is the feature to be detected. For each pixel, the intensity I[x,y] of the pixel in question is represented by its particular level of hatching. In FIG. 1B, the calculated probabilities Q[x,y] are shown. The probabilities are calculated using a known corner detector, such as a Harris corner detector.

Usually, more than one pixel around a feature has a high absolute probability value, which can be seen in FIG. 1C. Thus, setting a threshold of e.g. 100 would lead to 5 pixels being determined corner pixels, as indicated in FIG. 1C by the crosses. For this reason, a non-maximum suppression is commonly performed after the calculation of the feature probability values Q[x,y]. The non-maximum suppression selects the pixel with the highest probability of being a feature in an independently defined neighborhood. In this way, a local extremum, i.e. a local maximum in the example of FIG. 1, is detected.

The result of the feature detection is a Boolean matrix M[x,y] stating true if Q[x,y] is a local maximum. In other words, the pixel whose feature probability value is a local maximum is attributed an indication denoting this fact. In FIG. 1D, this indication, which is attributed to the pixel with the feature probability value of 575, is depicted with a cross.

Figures 3D, 3E, 3F:
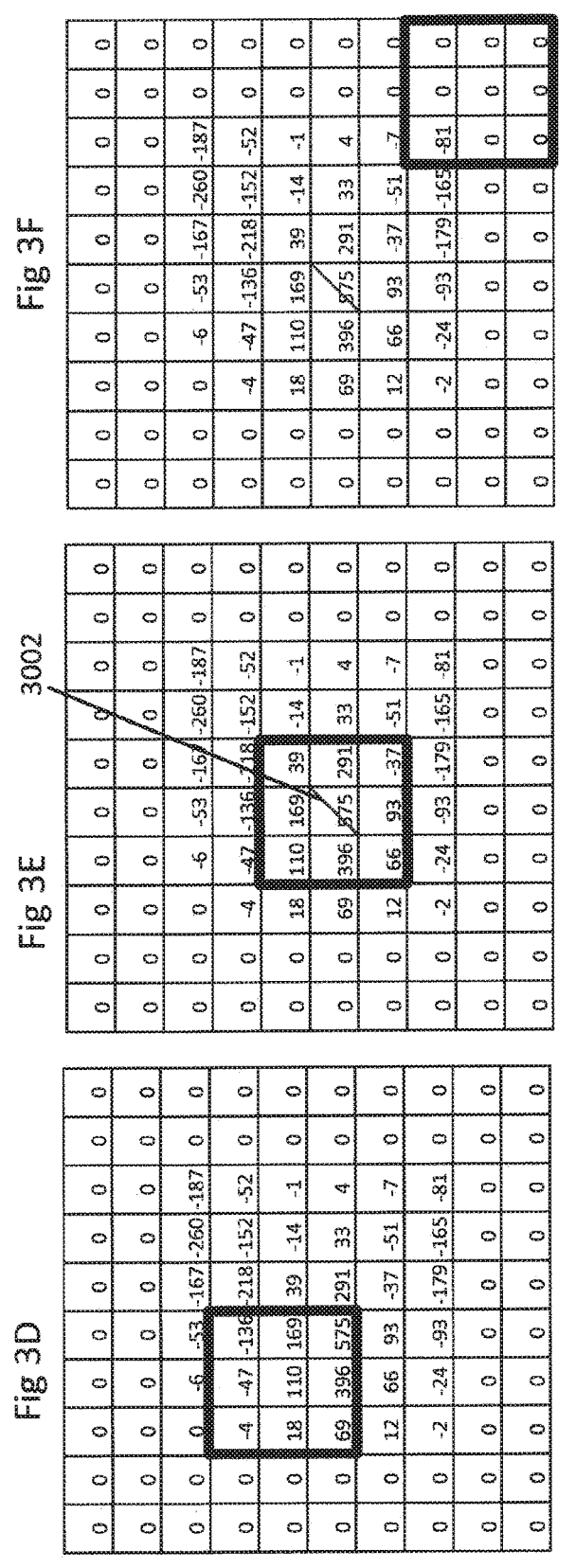

With respect to FIGS. 2 to 4, a known method of non-maximum suppression is described, which is carried out after the calculation of the feature probability values, in order to sort out strong neighbors that are above a global threshold but below a local maximum. In the example described, only if the feature probability value is a maximum in a 3×3 pixel neighborhood around it, the pixel in question is considered a local maximum. The neighborhood is also referred to as comparison window or just window. In theory, this 3×3 neighborhood W[x,y] could be of any size dim(W[x,y])=(2m+1)×(2n+1), with 3≤(2m+1)≤image width and 3≤(2n+1)≤image height. Usually, m and n are in a range of 1≤m≤3 and 1≤n≤3. The value of dim(W[x,y]) defines the number of rows and columns in the neighborhood. [x,y] defines the center pixel. If the neighborhood has odd numbers of rows and columns, the center is the actual center pixel. The whole (2m+1)×(2n+1) neighborhood is compared to the central pixel. Also, approaches optimized for the number of calculations can be used.

FIG. 2 is the legend for the algorithmic explanations. FIG. 2A shows a pixel with the value Q[x,y]=−5 and M[x,y]=false, i.e. the [x,y] pixel is not considered a local maximum. FIG. 2B shows a pixel with Q[x,y]=18 and M[x,y]=true, i.e. the [x,y] pixel is considered a local maximum. This determination of a local maximum is illustrated by the strike-through from the bottom left to the top right. FIG. 2C shows the motion of the window in a line-wise approach as used in the example.

The non-maximum-suppression method can be described as a set of commands as follows:

For all a,b in neighborhood:
If Q[x,y]>Q[a,b]
M[x,y]=true
else
M[x,y]=false

The steps performed for a single window with the center pixel [x,y] can be written as a set of commands as follows:
If (Q[x,y]>Q[x−1,y−1]) AND (Q[x,y]>Q[x,y−1]) AND (Q[x,y]>Q[x+1,y−1]) AND (Q[x,y]>Q[x−1,y]) AND (Q[x,y]>Q[x+1,y]) AND (Q[x,y]>Q[x−1,y+1]) AND (Q[x,y]>Q[x,y+1]) AND (Q[x,y]>Q[x+1,y+1])
M[x,y]=true
else
M[x,y]=false The entirety of the comparisons for one neighborhood (i.e. for one window) is referred to as one comparison operation. In other words, a comparison operation is the combination of comparisons performed for a selected window or neighborhood. In the present example, at the end of the comparison operation, a determination is made whether or not the center pixel is a local maximum.

FIGS. 3A to 3F show several steps of the non-maximum suppression with dim(W[x,y])=3×3 for an example of a 10×10 pixel image. In all FIGS. 3A to 3F, the feature probability values Q[x,y], which are attributed to the pixels of the image, are shown in 10 lines and 10 columns, representing the image dimension. In FIG. 3A, the $1^{st}$ step of the non-maximum suppression, i.e. the first comparison operation, is illustrated, with reference numeral 3001 highlighting the neighborhood W[x,y]. FIGS. 3B to 3F show the $2^{nd}$, $9^{th}$, $27^{th}$, $36^{th}$ and $64^{th}$ step of the non-maximum suppression, i.e. the $2^{nd}$, $9^{th}$, $27^{th}$, $36^{th}$, and $64^{th}$ comparison operation. The window of the values to be compared is highlighted for the steps depicted. As can be seen, the algorithm only checks non-border pixels.

In the $36^{th}$ step, which is depicted in FIG. 3E, the algorithm finds Q[5,6]=512 to be a local maximum in W[5,6]. Hence, M[5,6] is set to "true", which is indicated by the line through pixel [5,6], illustrated by reference numeral 3002. As can be seen in FIG. 3, the window of FIG. 3E is the only window where the center pixel has the highest feature probability value. Accordingly, the non-maximum suppression only finds one local maximum in the exemplary embodiment of FIG. 3E.

In short, the common non-maximum suppression outputs a Boolean M[x,y] for each pixel based on the feature probability values Q[x,y] in the neighborhood. The feature probability value Q[x,y] is computed based on a window function (e.g. a filter) based on intensity values of the image pixels. The Boolean value is true if the feature probability value is the maximum in a neighborhood W[x,y] with [x,y] being the center of W. Written as a set of commands: M[x,y]=true, if Q[x,y] max in W[x,y]; false else.

In common hardware systems, one pixel is put into the pipeline each clock cycle. The common approach for window functions in those systems is to store the input data in FIFO line buffers, as stated in Lu, C. & Fu, L. "Hardware architecture to realize multi-layer image processing in real-time" *Industrial Electronics Society, 2007. IECON 2007. 33rd Annual Conference of the IEEE*, 2007, 2478-2483, and to store the window operant in flip flops as seen in FIG. 4. As discussed above, the standard approach for non-maximum suppression is to compare all the feature probability values in an odd sized neighborhood, such as a 3×3 neighborhood, to the feature probability value of the center pixel. In general, this requires a filter 4001 with dim(W[x,y])= (2m+1)×(2n+1). W[x,y] contains all Q[i,j] with x−m≤i≤x+m and y−n≤j≤y+n. Therefore, 2n lines have to be stored in 2n line buffers if implemented in hardware, as stated in Rao, Daggu Venkateshware, et al., "Implementation and evaluation of image processing algorithms on reconfigurable architecture using C-based hardware descriptive languages." *International Journal of Theoretical and Applied Computer Sciences* 1.1 (2006): 9-34. FIG. 4 shows a 3×3 window function via filter 4001, wherein 2 lines of feature probability values have to be stored in 2 line buffers 4002. Each input element of the non-maximum suppression is the size of the result of the preceding calculation, i.e. of the feature probability value calculation. Other approaches like Neubeck, Alexander, and Luc Van Gool. "Efficient non-maximum suppression." *Pattern Recognition, 2006. ICPR 2006. 18th International Conference on*. Vol. 3. IEEE, 2006, had the goal to reduce the number of comparisons, but are unsuited for hardware implementation as they are not adaptable for the input-flow of one pixel per clock.

It would be beneficial to provide a hardware implementation of the non-maximum suppression that reduces the hardware resources needed. In particular, it would be beneficial to provide such an improved hardware implementation that is able to work with a one pixel per clock pipeline.

Exemplary embodiments of the invention include an apparatus for detecting a feature in an image, the apparatus comprising an image input section for receiving at least part of the image in the form of image data comprising a plurality of pixels, the plurality of pixels comprising a plurality of non-border pixels of the image, a feature detection module adapted to attribute a feature probability value to each of the pixels of the image data, and an extremum determination module for determining at least one local extremum among the feature probability values, wherein the extremum determination module is adapted to output, for each of the plurality of pixels, a final indication if the feature probability value of the pixel in question is a local extremum. The apparatus is characterized in that it comprises a preliminary indication memory adapted to store, for each of a portion of the plurality of pixels, a preliminary indication if the feature probability value of the pixel in question is a potential local extremum. The apparatus is further characterized in that the extremum determination module is adapted to use, for each of the plurality of the non-border pixels, comparison results of at least two comparison operations, with each comparison operation comprising a comparison of the feature probability value of the non-border pixel in question with the feature probability values of a respective subset of neighboring pixels, with the respective subsets of neighboring pixels being different subsets. The apparatus is further characterized in that the extremum determination module is adapted to store a preliminary indication in the preliminary indication memory for each of the plurality of non-border pixels at least once between two of the at least two comparison operations and in that the extremum determination module is adapted to determine the final indication, for each of the plurality of non-border pixels, according to the preliminary indication for the pixel in question in combination with comparison results of at least one of the at least two comparison operations for the pixel in question.

By splitting up the finding of the local extremum between multiple comparison operations, the overall data storage capacities and/or the overall bandwidth needed for communication between the individual modules of the apparatus can be decreased. In particular, performing separate comparison operations with subsets of neighboring pixels allows for fewer feature probability values being needed at the time of the comparison operation. By checking different subsets of neighboring pixels in a subsequent manner, a full determination if the pixel in question is a local extremum is still ensured. However, storing preliminary indications for the pixels is less memory-intensive than storing more feature probability values to be available for the comparisons. This is because the preliminary indications are, in general, Boolean values, requiring only one bit of memory, while storing of the feature probability values commonly requires a large number of bits due to their high granularity. In short, the same result of finding at least one local extremum can be achieved with significantly less memory requirements and/or significantly less communication resources on internal buses. By decreasing memory and/or communication bandwidth, space savings and/or power savings can be achieved.

The term subset of neighboring pixels refers to a group of pixels that, together with the pixel in question, form a window for a comparison operation. In other words, the window for a particular comparison operation consists of the pixel in question and the respective subset of neighboring pixels. In particular, a subset of neighboring pixels does not include all direct neighbors of the pixel in question. To the contrary, it includes a selection of direct neighbors, including at least two direct neighbors, with direct neighbors also being referred to as immediate neighbors. The subset of neighboring pixels may also include non-direct neighbors, which have a connection to the pixel in question via the direct neighbors in the subset. The subset of neighboring pixels may comprise 2, 3, 4, 5, 6 or 7 direct neighbors. As a general remark, every non-border pixel has 8 direct neighbors, surrounding the pixel in question.

The term comparison operation refers to the comparison of the feature probability value of the non-border pixel in question with the feature probability values of the pixels in the respective subset of neighboring pixels. Accordingly, the term comparison operation refers to a set of comparisons and does not refer to a single comparison between two values. The result of a comparison operation may be used not only for the pixel in question, but also for one, more, or all of the pixels in the subset of neighboring pixels. In this way, the determination of the at least one local extremum may be made more efficient. In particular, a preliminary or final indication may be stored/output for the pixel in question and all pixels of the subset of neighboring pixels after the comparison operation, as will be explained in more detail below. While this still means that a preliminary indication is stored in the preliminary indication memory for every non-border pixel at some point by the extremum determination module, it means that the overall number of comparison operations can be kept low.

The preliminary indication for the non-border pixel in question is an intermediate result that indicates if, after the comparison operation in question, it is still possible that the non-border pixel in question is a local extremum. Only if the preliminary indication stays positive throughout all comparison operations for the non-border pixel in question, the final indication will be positive for the non-border pixel in question. In other words, the extremum determination module is configured to only output a final indication indicating that the non-border pixel in question is a local extremum if the comparison results of all comparison operations indicate that the non-border pixel in question is a potential local extremum.

The preliminary indication memory is adapted to store the preliminary indication for a portion of the plurality of pixels. In other words, the preliminary indication memory is adapted to store a preliminary indication for a selected set of the plurality of pixels, but not for all of the plurality of pixels. The preliminary indication memory may have a size that allows for storing the preliminary indication for the portion of the plurality of pixels, but is not sufficient for storing a preliminary indication for all of the plurality of pixels. The expression of the preliminary indication memory being adapted to store a preliminary indication for each of a portion of the plurality of pixels does not mean that the preliminary indication memory stores the preliminary indications for a particular portion, i.e. for a particular subset, of the plurality of pixels. To the contrary, the preliminary indication memory is adapted to store the preliminary indication for a portion of the plurality of pixels only, but this portion changes over time. In other words, the preliminary indication memory may store the preliminary indications for different portions of pixels at different times. In yet other words, the preliminary indications stored in the preliminary indication memory belong to a dynamically changing portion of the plurality of pixels.

The extremum determination module uses the comparison results of at least two comparison operations, stores a preliminary indication between two of these at least two comparison operations, and determines the final indication according to the preliminary indication and at least one comparison operation for each non-border pixel. This is to be understood as follows. The at least two comparison operations are performed subsequently in time, i.e. the first comparison operations precedes the second comparison operation, which in turn precedes the third comparison operation (if present), etc. The sequence of these comparison operations is segmented into two or more comparison operation segments by the preliminary indication being stored in the preliminary indication memory. Each comparison operation segment may consist of one or more comparison operations. When the preliminary indication is stored in the preliminary indication memory, its value is dependent on the results of the previous comparison operation segment and, if applicable, on the value of the preliminary indication before the previous comparison operation segment. When the final indication is output, its value is dependent on the results of the last comparison operation segment, consisting of at least one of the comparison operations, and the value of the preliminary indication. A specific example is as follows. There may be four comparison operations for a pixel in question. The first and second comparison operations may be carried out one after the other, forming a first comparison operation segment. After the second comparison operation, the preliminary indication for the pixel in question may be stored in the preliminary indication memory. The third and fourth comparison operations may also be carried out one after the other, forming a second comparison operation segment. The final indication for the pixel in question is determined, taking into account the preliminary indication, as stored after the second comparison operation, and the results of the third and fourth comparison operations. In general words, it can be said that the final indication is determined according to the preliminary indication for the pixel in question and the results of at least one of the at least two comparison operations, carried out overall. In other words, at least one of the at least two comparison operations is carried out before the storing of the preliminary indication in the preliminary indication memory and at least one of the at least two comparison operations is carried out after the storing of the preliminary indication in the preliminary indication memory.

According to a further embodiment, the respective subsets of neighboring pixels for the comparison operations are overlapping subsets. In other words, for a given non-border pixel in question, every subset of neighboring pixels contains one pixel that is also contained in at least one other subset of neighboring pixels. In this way, the overall hardware implementation may be simplified. For example, it can be achieved in this way that square windows are used for the comparison operations, which are more easily handled by the hardware.

According to a further embodiment, each of the respective subsets of neighboring pixels comprises at least 3 immediately neighboring pixels, in particular exactly 3 immediately neighboring pixels. It is also possible that there are two subsets of neighboring pixels comprising 5 immediately neighboring pixels. In this way, the full local extremum check may be performed in two comparison operations. In the case of the subsets each having exactly 3 immediately neighboring pixels, the full local extremum check may be performed in four comparison operations. In both cases, the pixels needed for the comparison operation may be limited to two rows or two columns of the image.

According to a further embodiment, the extremum determination module is adapted to perform 4 comparison operations for each non-border pixel, and each of the 4 subsets of neighboring pixels consists of exactly 3 immediately neighboring pixels of the non-border pixel in question. After the 4 comparison operations, the final indication is output for the non-border pixel in question. This allows for a particularly advantageous replacement of a prior art non-maximum suppression on a 3×3 pixel neighborhood. Only three direct neighbors of the pixel in question must be available at the time of any given comparison operation, as compared to the eight direct neighbors being needed in the prior art approach. As the three direct neighbors may be taken from the row containing the pixel in question and from the row above or below the row containing the pixel in question, feature probability values from only two rows are needed at the time of any given comparison operation. Accordingly, less rows of feature probability values need to be stored, as compared to the prior art.

According to a further embodiment, for each of the plurality of non-border pixels, the combination of all of the respective subsets of neighboring pixels includes all immediately neighboring pixels of the non-border pixel in question. In this way, it can be ensured that a pixel is only deemed a feature if its feature probability value is higher than the feature probability values of all 8 pixels surrounding the non-border pixel in question.

According to a further embodiment, the extremum determination module is adapted to perform, for a particular comparison operation, a comparison of the feature probability value of each pixel in a window, consisting of the non-border pixel in question and the respective subset of neighboring pixels of the particular comparison operation, to the feature probability value of each other pixel in the window. In other words, it can be determined which of the pixels in the window is the extremum in this particular window. In this way, the extremum determination module is not only able to determine if the non-border pixel in question is a potential local extremum, but also if any of the pixels of the respective subset of neighboring pixels is a potential local extremum. Accordingly, this one comparison operation can be seen as a carrying out of simultaneous comparison operations for each of the pixels in the window. For example, the particular comparison operation can be the first comparison operation for one of the pixels in the window and at the same time be the second comparison operation for another one of the pixels in the window and at the same time be the third comparison operation for yet another one of the pixels in the window, etc. In this way, a high processing efficiency can be reached.

According to a further embodiment, the extremum determination module is adapted to use the comparison results of the particular comparison operation for all of the pixels in the window. Accordingly, it is ensured that the comparison operation for every window has to be performed only once. Although a first non-border pixel in question and a first particular subset of neighboring pixels of this first non-border pixel in question may form the same window as a second non-border pixel in question and a second particular subset of neighboring pixels of this second non-border pixel in question, this one window is only treated once in one comparison operation. This helps in achieving a high processing efficiency.

According to a further embodiment, the extremum determination module is, for a given comparison operation, adapted to output a final indication for at least one pixel of a window, consisting of the pixel in question and the respective subset of neighboring pixels, adapted to store a preliminary indication in the preliminary indication memory for at least one pixel of the window and adapted to locally store a preliminary indication for at least two pixels of the window for being used in a subsequent comparison operation. In other words, the comparison operation in question is the final comparison operation for at least one of the pixels in the window, leading to the output of the final indication for this pixel/these pixels, while the comparison operation in question is at the same time a non-final comparison operation for the other pixels in the window. For these other pixels in the window, preliminary indications are determined. These preliminary indications are either stored locally in the extremum determination module, where they can be accessed in subsequent comparison operations, or they are stored in the preliminary indication memory, from where they can be read in at a later point in time for one or more further comparison operations. In a particular embodiment, the locally stored preliminary indications are used in the directly ensuing comparison operation(s), while the preliminary indication(s) stored in the preliminary indication memory are processed at a later point in time, such as one row of pixels later when row-wise processing is performed. In other words, the preliminary indication memory is a longer-term memory than the local buffering between ensuing comparison operations in the extremum determination module itself. For the example of the window being a 2×2 window, the extremum determination module may be adapted to output exactly one final indication, to store exactly one preliminary indication in the preliminary indication memory and to locally store exactly two preliminary indications.

According to a further embodiment, the window is a (m+1)×(n+1) pixel window and the extremum determination module is adapted to output the final indication for a corner pixel of the window and to store the preliminary indication in the preliminary indication memory for those m or n pixels that form, together with said corner pixel, a window edge of the window. In other words, while one final indication is output by the apparatus after a given comparison operation, the preliminary indications of m or n pixels are stored in the preliminary indications memory. With those m+1 or n+1 pixels belonging to the same edge of the window, i.e. to the same row or column of the window, depending if row-wise or column-wise processing is carried out, the window may move on one row or one column after each comparison operation, leading to high processing efficiency. In a particular example, the final indication may be determined for the top left pixel of the window and the preliminary indications for the respective left pixels of the n bottom rows of the window may be stored in the preliminary indication memory. In another example, the final indication may be determined for the top left pixel of the window and the preliminary indications for the respective top pixels of the m right rows of the window may be stored in the preliminary indication memory.

According to a further embodiment, the window is a 2×2 pixel window. Particularly high memory savings and a particularly high processing efficiency can be reached, when 2×2 pixel windows are processed in any given comparison operation.

According to a further embodiment, the extremum determination module is adapted to output the final indication for exactly one pixel per clock cycle. In other words, the apparatus for detecting the feature can process the image at a ratio of one pixel per clock cycle. Accordingly, while a higher number of comparisons may be employed with the apparatus according to the invention, the processing speed is equal to the prior art. In other words, the apparatus is able to significantly reduce the buffer storage requirements and/or the internal communication bandwidth needed, while having no negative effect on timing.

According to a further embodiment, the preliminary indication memory is a preliminary indication buffer having a size to store the preliminary indication for one of a row of pixels and a column of pixels. In other words, the preliminary indication buffer has a size to store the preliminary indication for a row of pixels or has a size to store the preliminary indication for a column of pixels. If the apparatus employs a line-wise approach of finding the at least one local extremum in the image, the preliminary indication buffer has a size to store the preliminary indication for a row of pixels. If the apparatus employs a column-wise approach of finding the at least one local extremum in the image, the preliminary indication buffer has a size to store the preliminary indication for a column of pixels. A preliminary indication buffer is an easy-to-implement way of storing the preliminary indications. In a particular embodiment, the preliminary indication buffer may be of exactly such a size that it can store the preliminary indication for a row of pixels or for a column of pixels. As the preliminary indication may be a Boolean value, the preliminary indication buffer may have a bit size equaling the number of pixels in a row or column of the image.

The preliminary indication memory is coupled to the extremum detection module. In the case of the preliminary indication memory being a preliminary indication buffer, the input of the preliminary indication buffer may be coupled to an output of the extremum detection module and the output of the preliminary indication buffer may be coupled to an input of the extremum detection module.

According to a further embodiment, the apparatus further comprises exactly one probability value buffer having a size to store the feature probability values for a row of pixels or having a size to store the feature probability values for a column of pixels, with the probability value buffer being coupled between the feature detection module and the extremum determination module. If the apparatus employs a line-wise approach of finding the at least one local extremum in the image, the probability value buffer has a size to store the feature probability values for a row of pixels. If the apparatus employs a column-wise approach of finding the at least one local extremum in the image, the probability value buffer has a size to store the probability values for a column of pixels. Due to the storing of the preliminary indications in the preliminary indication memory, the apparatus may be able to perform a full determination of at least one local extremum with one probability value buffer of above discussed size only. In addition to the coupling via the probability value buffer, the feature detection module and the extremum detection module may also be coupled via a direct connection.

According to a further embodiment, the feature detection module is adapted to output the feature probability values for two adjacent pixels to the extremum determination module at the same time, with no probability value buffer being provided between the feature detection module and the extremum determination module. In this way, all feature probability value buffering requirements between the feature detection module and the extremum determination module may be dispensed with. If a line-wise approach is used, the two adjacent pixels may be pixels of two adjacent rows. If a column-wise approach is used, the two adjacent pixels may be pixels of two adjacent columns. The elimination of all buffers between the feature detection module and the extremum detection module does not affect the buffering of the feature probability values of the pixel in question and the subset of neighboring pixels in question in the extremum detection module for the comparison operation. This local buffering is still provided for.

According to a further embodiment, the feature detection module and the extremum determination module are coupled to each other and to a random access memory via a data bus system, with the random access memory comprising the preliminary indication memory. In such a data bus architecture, the invention allows for a reduction of bandwidth for the data bus system, because fewer feature probability values have to be communicated between the feature detection module, the extremum detection module and the random access memory. A reduction in RAM storage capacity may also be achieved, because fewer feature probability values have to be stored.

According to a further embodiment, the apparatus, having the above described data bus structure, further comprises a direct link between the feature detection module and the extremum determination module in addition to the data bus system. This is a further means of reducing the communications requirements on the bus for the feature detection.

According to a further embodiment, no probability value buffer and no preliminary indication buffer are provided in the apparatus having the above described data bus structure, with all buffering of feature probability values and preliminary indication values being effected by the random access memory. In this way, all intermediate values and results of the feature detection may be stored exclusively in the random access memory, leading to an overall very space-efficient system, because no dedicated buffers for the feature detection are needed.

According to a further embodiment, the preliminary indication is initialized to a value that indicates that the feature probability value of the non-border pixel in question is a potential local extremum, and the extremum determination module is adapted to alter said value if it determines in one of the comparison operations that the feature probability value of the non-border pixel in question is not a local extremum. By initializing the preliminary indication, the number of alterations/changes of the intermediate results can be kept low. Also, a well-defined behavior of the feature detection is ensured. In this case, the final indication may only indicate that the feature probability value of the non-border pixel in question is a local extremum if the value of the preliminary indication is not altered in any of the comparison operations.

According to a further embodiment, the feature probability value is a value that indicates a probability that a corner is present in the image at the respective pixel. In other words, the feature to be detected in the image is a corner. Also, if more than one corner is present in the image, multiple features may be detected. This corresponds to multiple local extrema being detected in the feature probability values.

A local extremum may be a local maximum or a local minimum in the feature probability values.

Exemplary embodiments of the invention further include a method of detecting a feature in an image, the method comprising the steps of receiving at least part of the image in the form of image data comprising a plurality of pixels, the plurality of pixels comprising a plurality of non-border pixels, performing a feature detection algorithm on the image data to attribute a feature probability value to each of the pixels of the image data, determining at least one local extremum among the feature probability values, and outputting, for each of the plurality of pixels, a final indication if the feature probability value of the pixel in question is a local extremum. The method is characterized in that the step of determining at least one local extremum comprises, for each non-border pixel, performing a first comparison operation comparing the feature probability value of the non-border pixel in question with the feature probability values of a first subset of neighboring pixels and determining a preliminary indication if the feature probability value of the non-border pixel in question is a potential local extremum; performing one or more further comparison operations comparing the feature probability value of the non-border pixel in question with the feature probability values of one or more further subsets of neighboring pixels, different from the first subset of neighboring pixels, and updating the preliminary indication on the basis of the one or more further comparison operations; storing the preliminary indication at least once in a preliminary indication memory between two of the first comparison operation and the one or more further comparison operations; and outputting the preliminary indication as the final indication after the completion of all of the one or more further comparison operations.

The term updating the preliminary indication is intended to encompass an altering of the preliminary indication, in case the further comparison operation requires the indication to be changed, as well as a keeping of the preliminary indication, in case the further comparison operation does not require the indication to be changed.

According to a further embodiment, the step of performing one or more further comparison operations comprises checking the preliminary indication for the non-border pixel in question before a particular one of the one or more further comparison operations; if the preliminary indication indicates that the feature probability value of the non-border pixel in question is a potential local extremum, carrying out the comparing of the feature probability value of the non-border pixel in question with the feature probability values of the further subset of neighboring pixels of the particular one of the one or more further comparison operation; and if the preliminary indication indicates that the feature probability value of the non-border pixel in question is not a potential local extremum, skipping the comparing of the feature probability value of the non-border pixel in question with the feature probability values of the further subset of neighboring pixels of the particular one of the one or more further comparison operation. In other words, if it is already known that the feature probability value of the non-border pixel in question is not a local extremum, the remaining comparison operation(s) can be dispensed with. In this way, processing efficiency can be increased.

The method of detecting a feature in an image allows for the same advantages discussed above with respect to the apparatus for detecting a feature in an image. Further, above discussed additional features and modifications apply to the method of detecting a feature in an analogous manner.

FIG. 5 shows an exemplary flow diagram representation of a local maximum detection, which forms the basis of an exemplary apparatus and an exemplary method for detecting a feature in an image in accordance with the present invention. Instead of comparing the feature probability value of a pixel $Q[x,y]$ to every neighboring pixel in a neighborhood with $dim(W)=(2m+1)\times(2n+1)$ and outputting $M[x,y]$ directly for the central pixel, as described above with respect to the prior art, $M[x,y]$ is derived iteratively.

After the start of the local maximum detection, all $M[x,y]$ are initialized with "true". After the initialization, the iterative determination of $M[x,y]$ is performed. In a given comparison operation, each pixel in a neighborhood of $dim(W)=(m+1)\times(n+1)$ is checked against the other pixels. In a window $W[x,y]$ containing all $Q[i,j]$ with $x-floor(m/2)\leq i\leq x+ceil(m/2)$ and $y-floor(n/2)\leq j\leq y+ceil(n/2)$, $M[x+\Delta x,y+\Delta y]$ is unset, i.e. set to "false", if $Q[x+\Delta x,y+\Delta y]$ is not a maximum in the neighborhood W for each $\Delta x,\Delta y$ in W. In a set of commands, this operation may be expressed as follows:

$M[x+\Delta x,y+\Delta y]$=true, if $Q[x+\Delta x,y+\Delta y]$ max in $W[x,y]$; false else.

$Q[x,y]$ refers to the feature probability value of the pixel $[x,y]$. $M[x,y]$ refers to the preliminary indication if the feature probability value of the pixel $[x,y]$ is a potential local maximum or to the final indication if the feature probability value of the pixel $[x,y]$ is a local maximum, depending if all comparison operations for the pixel $[x,y]$ have already been carried out or not.

In the exemplary embodiment of FIG. 5, the first window contains the top left corner pixel of the image and contains a number of neighboring pixels depending on the dimension of $W[x,y,]$. This initial setting of the window is carried out at step 5004. In general terms, the first element in a window $W[x,y]$ with $dim(W)=(m+1)\times(n+1)$ is $Q[x-floor(m/2),y-floor(n/2)]$, while the last element is $Q[x+ceil(m/2),y+ceil(n/2)]$. The order of elements may also be different, as long as all elements of the window are addressed, i.e. as long as all of the pixel in question and the subset of neighboring pixels are addressed. The setting and determination of the first and last element are carried out at steps 5005 and 5006, respectively. The next window is dependent on the kind of data input, which may be line-wise or column-wise or block-wise.

It is pointed out that the two inner loops of the flow diagram of FIG. 5 can be performed in parallel in hardware during one clock cycle, so that a fast implementation is possible.

In the following, an exemplary embodiment is described, wherein the dimension of the window is 2×2 pixels. Via the iterative comparison operations, it is detected if the pixel in question is a local maximum in a neighborhood with 3×3 pixels. For each comparison operation, the subset of neighboring pixels for the pixel in question consists of three directly neighboring pixels. The comparison operation for the four feature probability values and the setting of the preliminary/final indication may be written as a set of commands as follows:

M[x,y]=M[x,y], if Q[x,y] max in W[x,y]; false else;
M[x+1,y]=M[x+1,y], if Q[x+1,y] max in W[x,y]; false else;
M[x,y+1]=M[x,y+1], if Q[x,y+1] max in W[x,y]; false else;
M[x+1,y+1]=M[x+1,y+1], if Q[x+1,y+1] max in W[x,y]; false else.

Window 6002 in FIG. 6A shows a position layout for the pixels [x,y], [x+1,y], [x,y+1], and [x+1,y+1] in the 2×2 window.

The comparison operation may be one of the multiple comparison operations for each of the pixels [x,y], [x+1,y], [x,y+1], [x+1,y+1]. In other words, each of the pixels [x,y], [x+1,y], [x,y+1], [x+1,y+1] may be the "pixel in question" during the described comparison operation. In order to not carry out the same comparison operation 4 times, the described comparison operation may be used for all 4 pixels [x,y], [x+1,y], [x,y+1], [x+1,y+1], i.e. each of the pixels may be the "pixel in question" simultaneously.

Figures 6D, 6E, 6F:
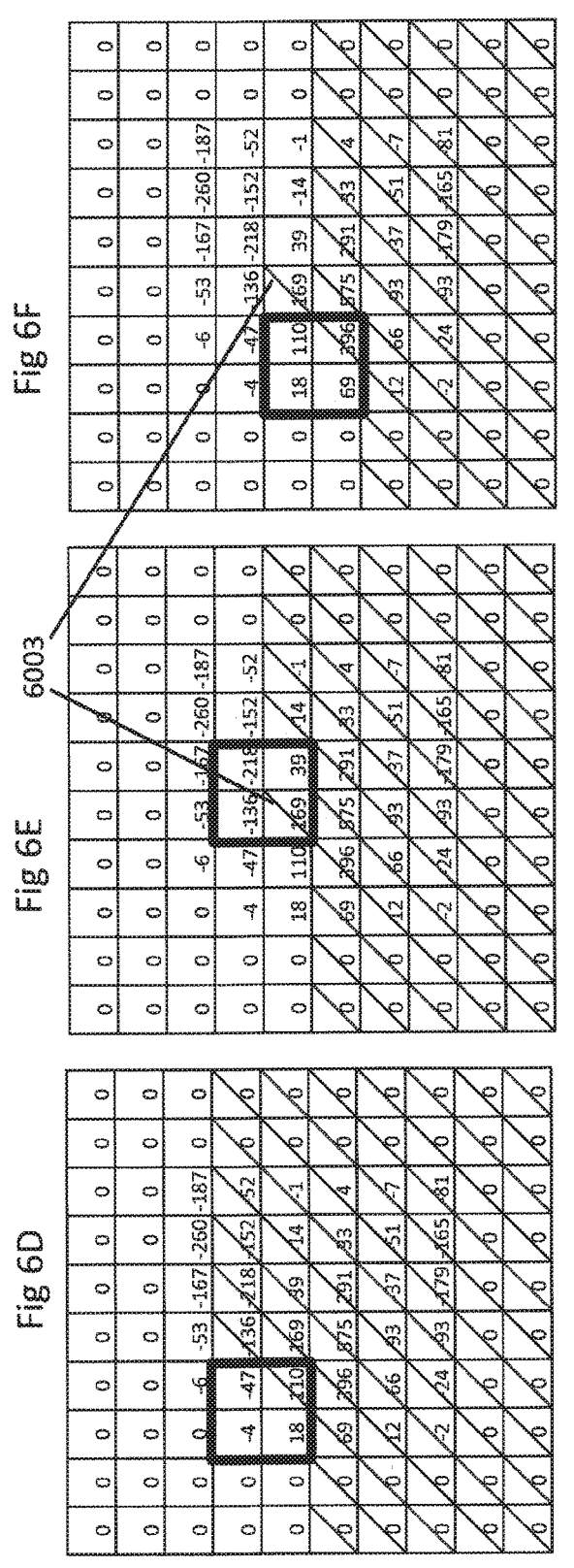
Figures 6J, 6K, 6L:
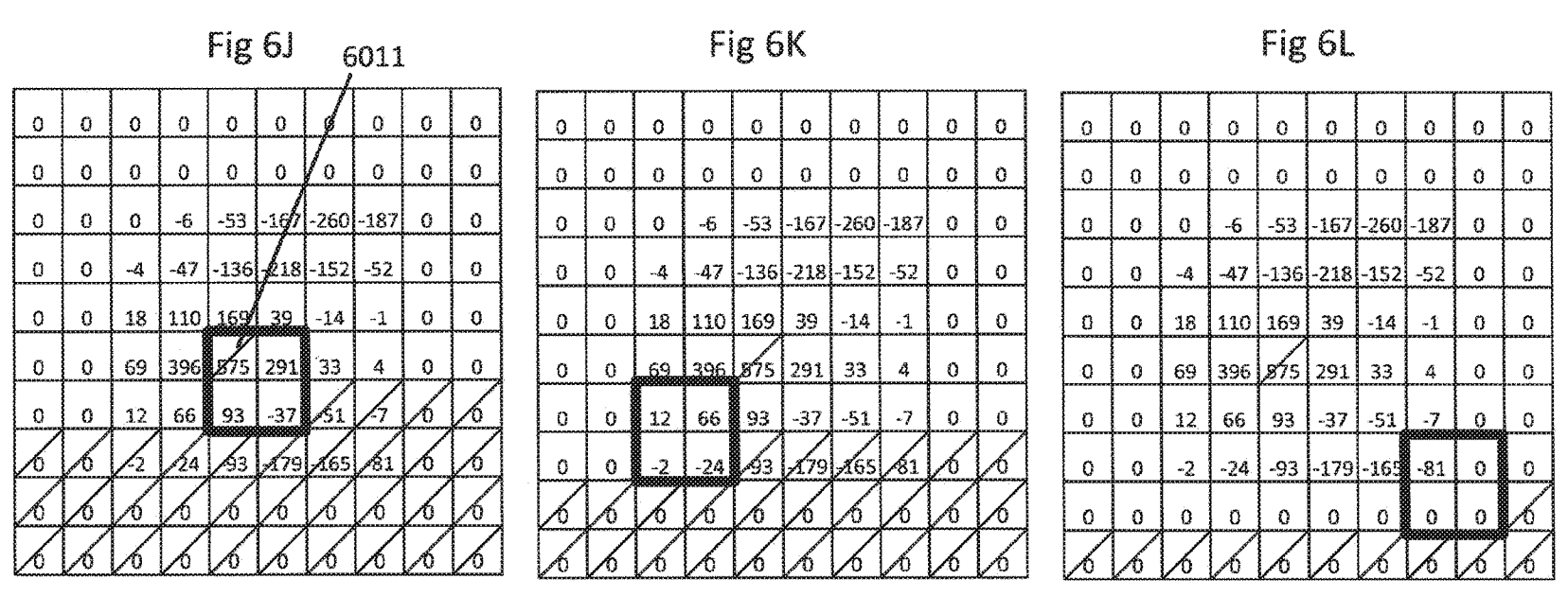

In a set of commands, the comparison operation may also be expressed as follows: For all i,j in neighborhood
For all a,b in neighborhood /=i,j
If Q[i,j]≤Q[a,b] in W
M[i,j]=false For a 2×2 window, the comparison operation may also be expressed as follows as a set of commands:
If (Q[x,y]≤Q[x+1,y]) OR (Q[x,y]≤Q[x,y+1]) OR (Q[x,y]≤Q[x+1,y+1]) M[x,y]=false
If (Q[x+1,y]≤Q[x,y]) OR (Q[x+1,y]≤Q[x,y+1]) OR (Q[x+1,y]≤Q[x+1,y+1]) M[x+1,y]=false
If (Q[x,y+1]≤Q[x,y]) OR (Q[x,y+1]≤Q[x+1,y]) OR (Q[x,y+1]≤Q[x+1,y+1]) M[x,y+1]=false
If (Q[x+1,y+1]≤Q[x,y]) OR (Q[x+1,y+1]≤Q[x+1,y]) OR (Q[x+1,y+1]≤Q[x,y+1]) M[x+1,y+1]=false FIGS. 6A to 6L show twelve exemplary comparison operations for the detection of local maximum values in the feature probability values of an exemplary 10×10 pixel image. The exemplary embodiment of FIG. 6 shows an embodiment wherein it is detected, for each pixel in question, if it is the local maximum in a neighborhood with 3×3 pixels. In the exemplary embodiment of FIG. 6, dim(W[x,y])=2×2, i.e. each comparison operation deals with the pixel in question as well as three direct neighbors. Via the iterative carrying out of comparison operations on 2×2 windows, it is detected if a pixel in question is a local maximum in a 3×3 neighborhood, which 3×3 neighborhood includes the pixel in question and the immediately neighboring pixels.

In FIG. 6A, the first window is referenced by reference numeral 6001. It can also be seen in FIG. 6A that the preliminary indication for all pixels is set to "true", illustrated by the diagonal line through each pixel. As no feature probability value in the first window 6001 is a maximum, all indications for the pixels in the first window are set to false.

FIGS. 6B to 6L show the 2$^{nd}$, 37$^{th}$, 38$^{th}$, 40$^{th}$, 47$^{th}$, 48$^{th}$, 49$^{th}$, 57$^{th}$, 58$^{th}$, 65$^{th}$, and 71$^{st}$ step of the feature detection. After all comparison operations up to the 40$^{th}$ step (FIG. 6E), feature probability value Q[5,5]=169 was a maximum and thus M[5,5] is still set to "true", as indicated by reference numeral 6003. This holds true also in the 47$^{th}$ step (FIG. 6F). It is in the 48$^{th}$ step that Q[5,5] is compared, inter alia, to Q[5,6]=575. As this value is greater, M[5,5] is set to "false", indicated by reference numeral 6006, but M[5,6] stays "true", indicated by reference numeral 6007. Q[5,6] is also the maximum in all other windows containing it (cf. FIGS. 6H, 6I, 6J). After the 58$^{th}$ step, the method finds Q[5,6]=512 to be a local maximum, because it is the last window to be checked containing pixel [5,6] and the preliminary indication had not been set to "false" previously. Hence, M[5,6] stays set to "true", as indicated by reference numeral 6011.

Figure 7A:
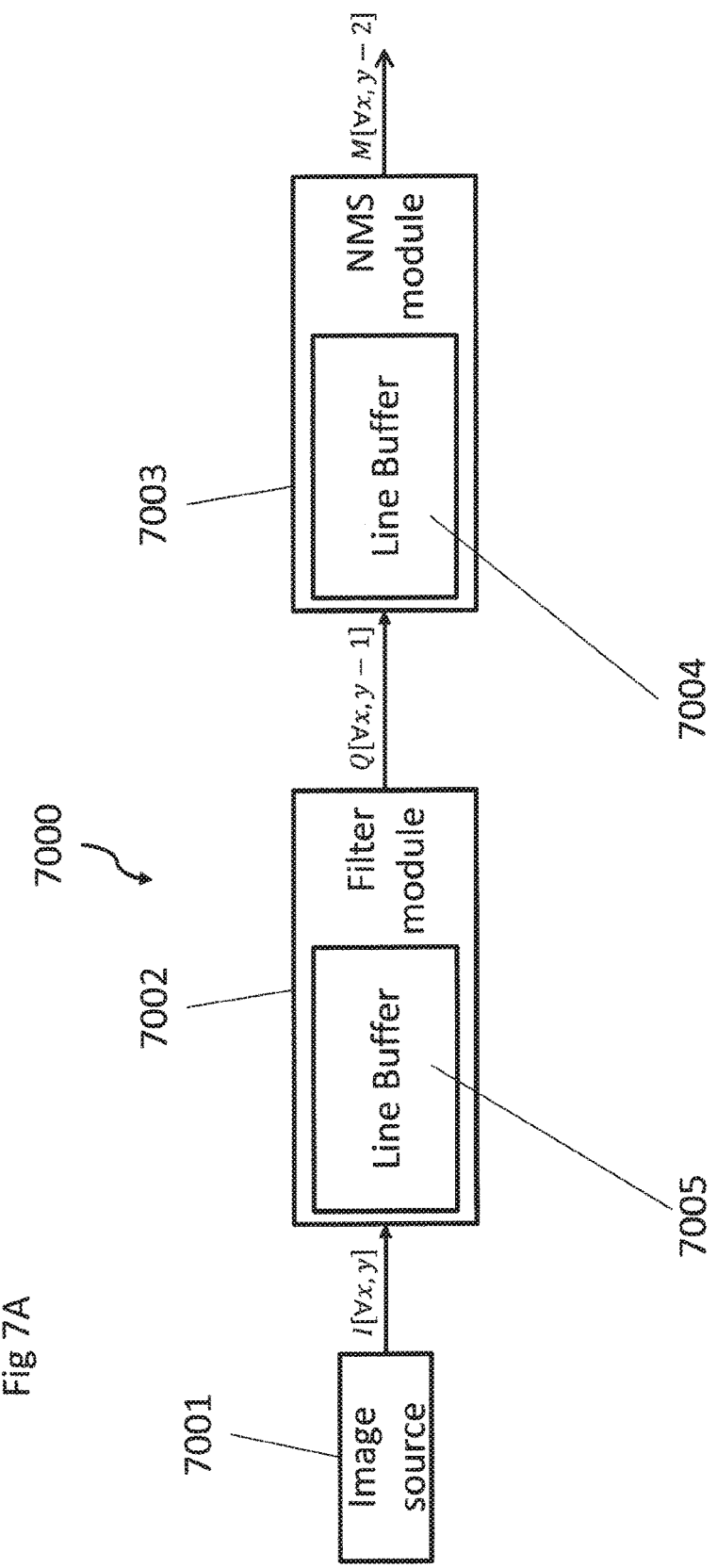

FIG. 7A shows an exemplary apparatus 7000 for detecting a feature in an image in accordance with the invention. The apparatus 7000 receives image data from an image source 7001, such as a camera, an external storage or a previous filter module. The image source 7001 may output the pixels to the apparatus 7000 continuously. In the exemplary embodiment of FIG. 7A, the pixels from the image source 7001 are read by the apparatus 7000 one pixel per clock in a line-wise, top to bottom order.

The apparatus 7000 comprises a feature detection module 7002 and an extremum determination module 7003. The feature detection module 7002 comprises a 3×3 filter in the exemplary embodiment of FIG. 7A, as will be explained below. The extremum determination module 7003 is a non-maximum suppression module in the exemplary embodiment of FIG. 7A. The feature detection module 7002 comprises two image data line buffers 7005. Further, one probability value line buffer 7004 is associated with the extremum determination module 7003 in the exemplary embodiment of FIG. 7A.

The image data I[x,y] is an 8-bit greyscale image in the exemplary embodiment, which is input to the feature detection module 7002. The outputs of the feature detection module 7002 are feature probability values Q[x,y], which are 32-bit values for each pixel in the exemplary embodiment of FIG. 7A. The feature probability values Q[x,y] are input into the extremum determination module 7003. Each clock, an intensity value, a feature probability value and a final indication are input/output.

Figure 7B:
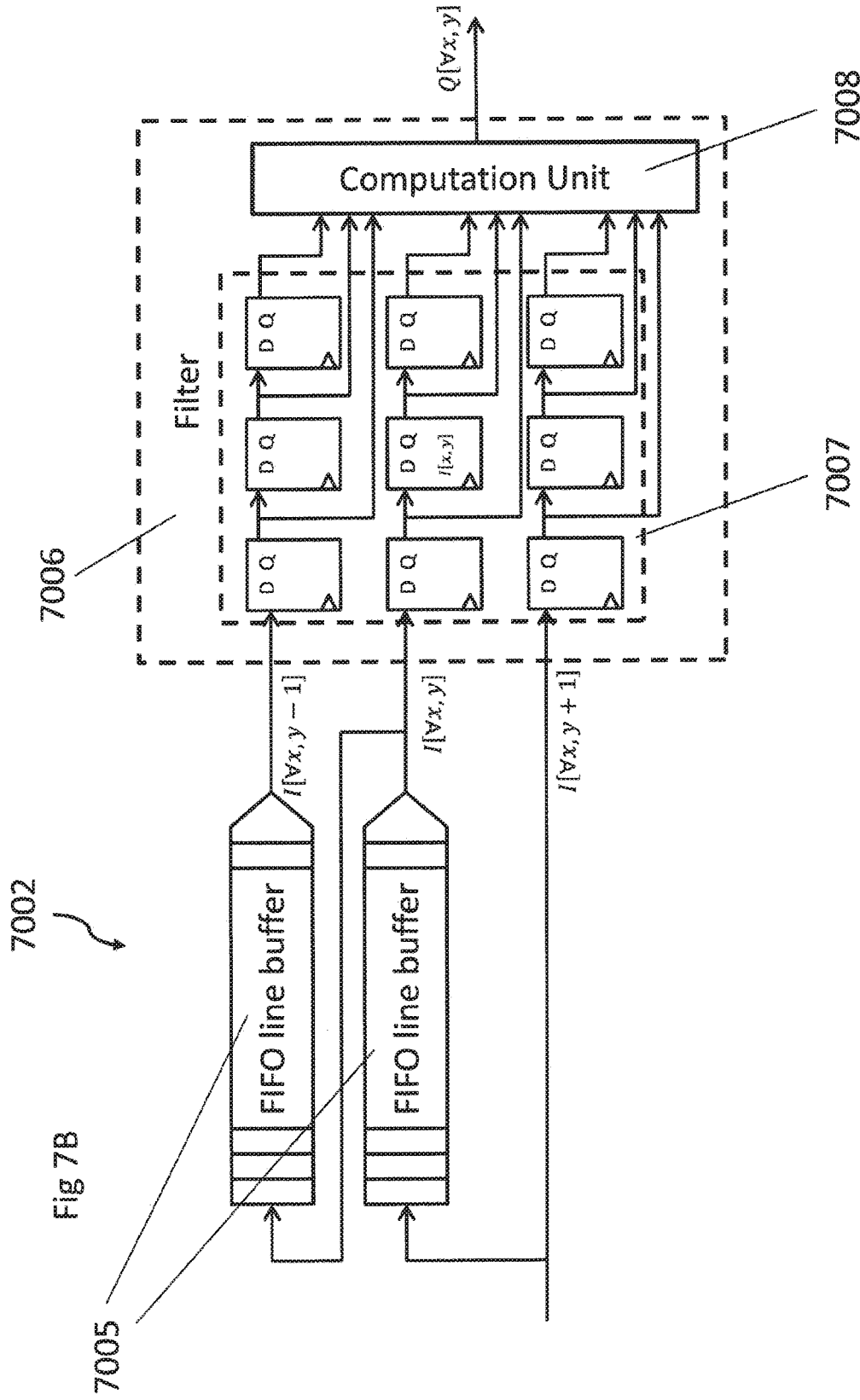

In FIG. 7B, an exemplary implementation of the feature detection module 7002 is shown. The two image data line buffers 7005 are FIFOs. For the ensuing 3×3 filter operation, two image data line buffers 7005 are provided. Each of the FIFO line buffers 7005 of the feature detection module must have the depth of the image width and the width of the pixel values. The buffered pixels, as well as the new one, are then input to the actual filter module 7006. The values for the 3×3 filter operation (i.e the 9 pixel values I[x−1,y−1], I[x,y−1], I[x+1,y−1], I[x−1,y], I[x,y], I[x+1,y], I[x−1,y+1], I[x,y+1], I[x+1,y+1]) are sent from the registers 7007 to the computation unit 7008, which then outputs the resulting feature probability values Q[x,y], as discussed above. To output the value Q[x,y], the value I[x+1,y+1] must have been input already.

In FIG. 7C, a more detailed block diagram of the apparatus 7000 is depicted. The feature detection module 7002 corresponds to the implementation discussed with respect to FIG. 7B. The description is not repeated, and reference is made to FIG. 7B. The extremum determination module 7003 is configured to carry out the comparison operations for 2×2 windows, as described above. In particular, the extremum determination module is provided, at its inputs, with feature probability values of two rows and with preliminary indications set earlier. On the basis of these inputs, the extremum determination module 7003 determines final and preliminary indications of extrema, as discussed above.

The final indications are output as M[x,y] for the respective pixels [x,y], as illustrated towards the right in FIG. 7C. For receiving the feature probability values Q[x,y] and Q[x,y+1], the extremum determination module 7003 is coupled to the feature detection module 7002 and to a probability value line buffer 7004, which is in turn coupled to the feature detection module 7002. The probability value line buffer 7004 is interposed between the feature detection module 7002 and the extremum determination module 7003. Further, the extremum determination module is coupled to a preliminary indication buffer 7015, to which it couples preliminary indications and from which it receives preliminary indications. The preliminary indication buffer 7015, as well as the probability value line buffer 7004, are FIFO buffers.

An exemplary implementation of the dataflow for FIG. 7C is as follows:

input image data of three lines I[$\forall$x,y], I[$\forall$x,y+1] and I[$\forall$x,y+2] to the 3×3 filter-module 7031 calculate the probability values Q[$\forall$x,y+1] in the 3×3 filter module 7031 load Q[$\forall$x,y] (known from previous calculations) from the probability value line buffer 7004 to the extremum determination module 7003 input Q[$\forall$x,y+1] to the probability value line buffer 7004 input Q[$\forall$x,y+1] to the extremum determination module 7003 input preliminary indications M[$\forall$x,y] 7023 (known from previous calculations or set by default values) from the preliminary indication buffer 7015 to the extremum determination module 7003 compute maximum indication values for the lines [$\forall$x,y] and [$\forall$x,y+1] in the extremum determination module 7003 output the maximum indication values (i.e. final indications M[$\forall$x,y] 7021) for the line [$\forall$x,y]

output the maximum indication values (i.e. preliminary indications M[$\forall$x,y+1] 7022) for the line [$\forall$x,y+1] to the preliminary indication buffer 7015

For FIG. 7D, instead of loading Q[$\forall$x,y] from the probability value line buffer 7004, it is calculated in the $2^{nd}$ 3×3 filter of the modified filter-module 7032, as described below.

Feature probability values for pixels of one line and preliminary indications for pixels of the same line are stored at any time during the feature detection in the probability value line buffer 7004 and the preliminary indication buffer 7015, respectively. As can be seen, this architecture only requires exactly one probability value line buffer, as compared to the prior art approach with two probability value line buffers, shown in FIG. 4. In the exemplary embodiment of FIG. 7, where the feature probability values Q[x,y] have 32 bits, one of the 32-bit line buffers 4002, shown in FIG. 4, has been replaced with a 1-bit line buffer 7015. For Full HD (i.e. for a 1920×1080 pixel image), this modification results in a saving of 31*1920=59520 bits of memory.

Figure 9:
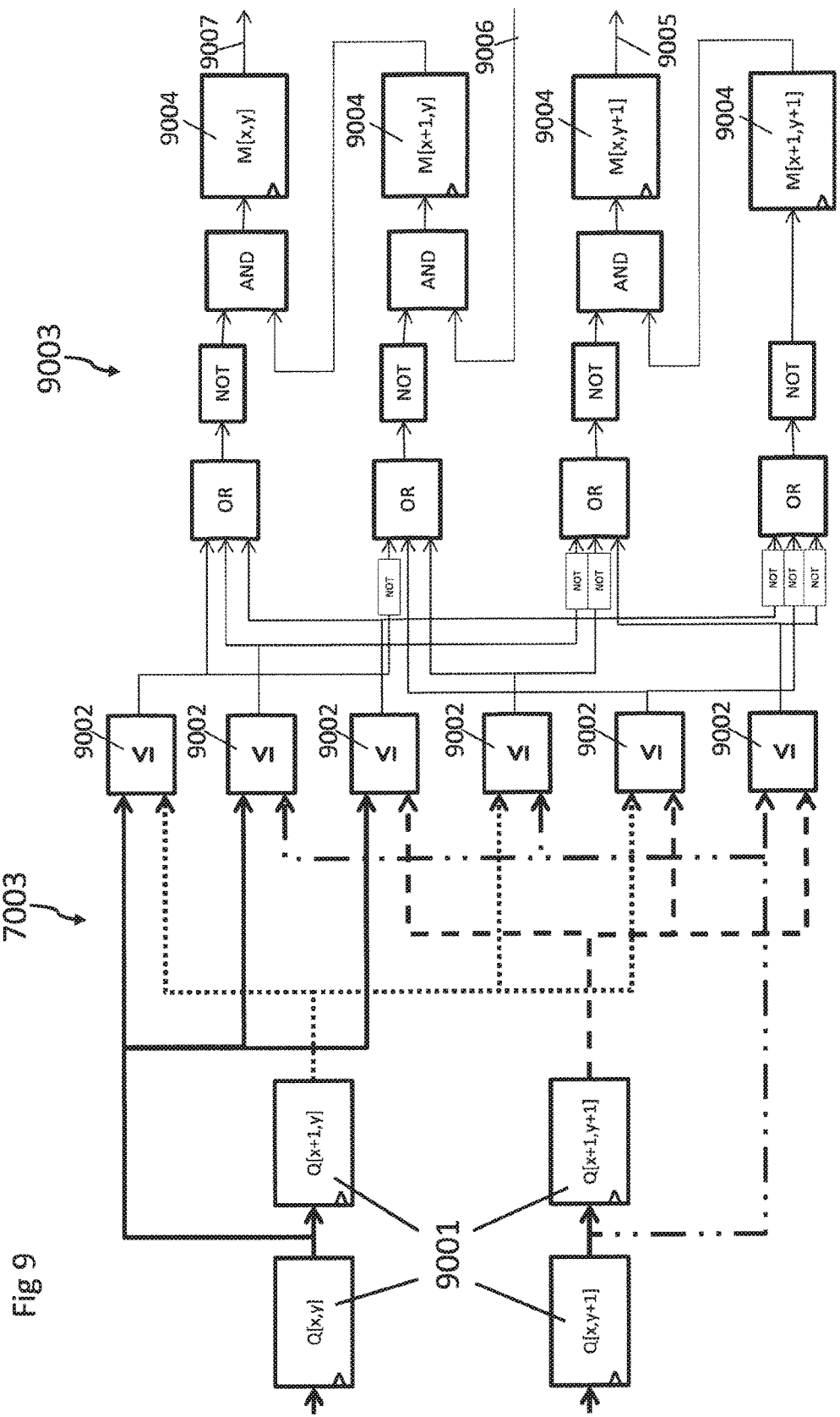
FIG. 9 shows an exemplary embodiment of an extremum determination module for being used in an apparatus for detecting a feature in an image in accordance with the invention.

In FIG. 9, an exemplary hardware architecture for the extremum determination module 7003 is shown. Four registers 9001 receive the feature probability values from the probability value line buffer 7004 and from the feature detection module 7002. Six comparators 9002 compare the feature probability values for all possible pixel combinations in the 2×2 pixel comparison window. On the basis of these comparisons and on the basis of previously known preliminary indications, a logic stage 9003 generates a final indication and three preliminary indications, which are output from indication output blocks 9004. The preliminary indication M[x+1,y+1] is generated from the comparisons only and stored locally to be used in the next comparison operation. The preliminary indication M[x,y+1] is generated from the comparisons and from a locally stored preliminary indication of a previous comparison operation. It is then output to the preliminary indication buffer via output 9005. The preliminary indication M[x+1,y] is generated from the comparisons and a preliminary indication read in from the preliminary indication buffer through input 9006. It is stored locally to be used in the next comparison operation. The final indication M[x,y] is generated from the comparisons and from a locally stored preliminary indication of a previous comparison operation. It is output through output 9007.

In FIG. 7D, an exemplary hardware architecture with a further memory reduction is shown. In the exemplary embodiment of FIG. 7D, the feature detection module 7002 is configured to output the feature probability values of two adjacent pixels of two adjacent rows at the same time. This allows the extremum determination module 7003 to make the extremum determination on the basis of the feature probability value inputs and on the basis of the preliminary indications only. No buffering of feature probability values in a probability line buffer between the feature detection module and the extremum determination module is necessary.

In order to be able to output two feature probability values at the same time, one more row of image data is input to the filter of the feature detection module. This filter performs two 3×3 filter operations in parallel. For this purpose, an additional line buffer for intensity values is provided in the feature detection module. In this way, the needed memory may be further reduced by 24*1920=46080 bits for a Full HD image (elimination of a 32 bit line buffer vs. addition of 8 bit line buffer).

With respect to FIG. 8, further exemplary embodiments of an apparatus 8000 for detecting a feature in an image in accordance with the invention are described. The exemplary embodiments rely on a hardware architecture with a central random access memory 8003 and a bus 8004, provided for connecting the components of the apparatus 8000. An image source 8002, the RAM 8003, a feature detection module 8005, and an extremum determination module 8006 are coupled to the bus 8004 for communication. Further, a direct connection 8007 is provided between the feature detection module 8005 and the extremum determination module 8006 for additional communication. The RAM 8003 comprises various line buffers 8001, as will be explained below.

The operation of the apparatus 8000 is as follows. The image source 8002 inputs the image to the RAM 8003 via the bus 8004. Only the current rows are stored inside the RAM 8003. E.g. for a 3×3 window function, three lines have to be present in the RAM 8003. The pixel values I[x,y] are input into the feature detection module 8005 in a word-wise manner depending on the bus size. If necessary for the particular embodiment, the feature probability values Q[x,y] are input from the RAM 8003 into the extremum determination module 8006 in a word-wise manner depending on the bus size. At least one line of feature probability values Q[x,y] is input directly from the feature detection module 8005 to the extremum determination module 8006 via the direct connection 8007.

Figure 8A:
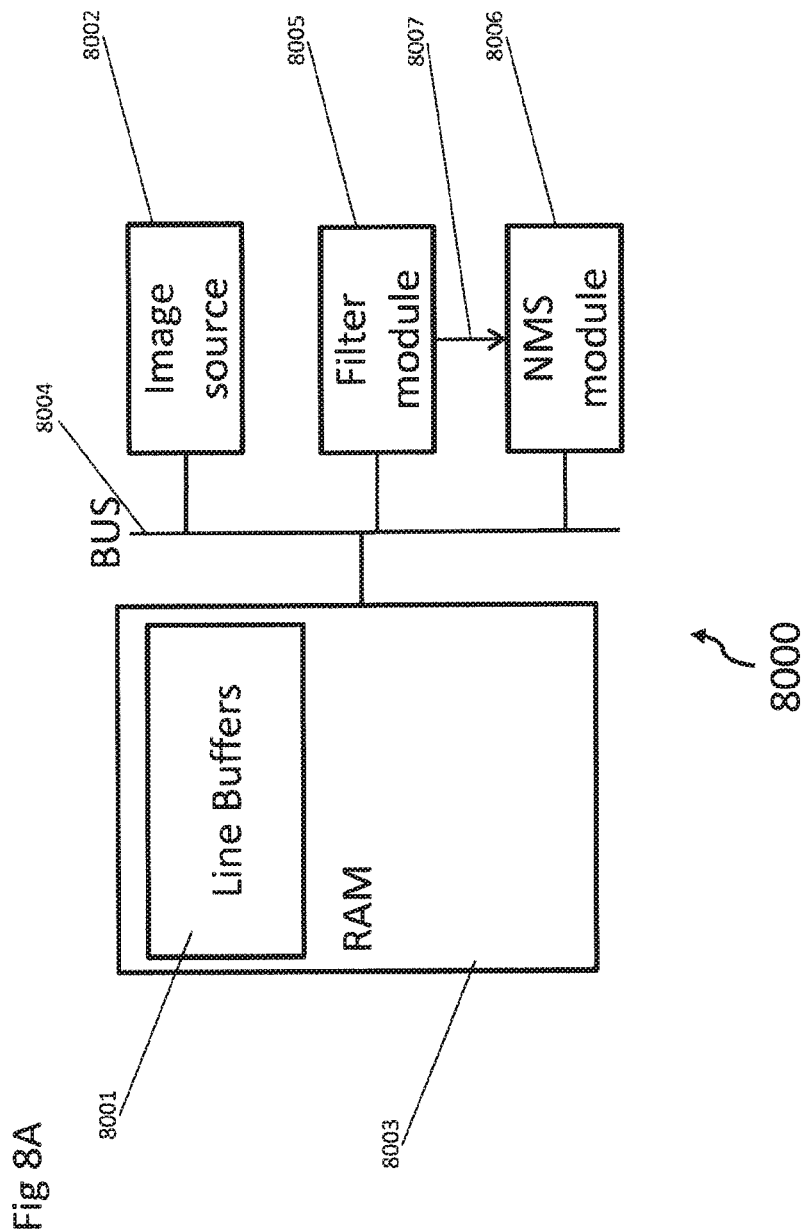
FIGS. 8A-8D show further exemplary embodiments of an apparatus for detecting a feature in an image in accordance with the invention.
Figure 8B:
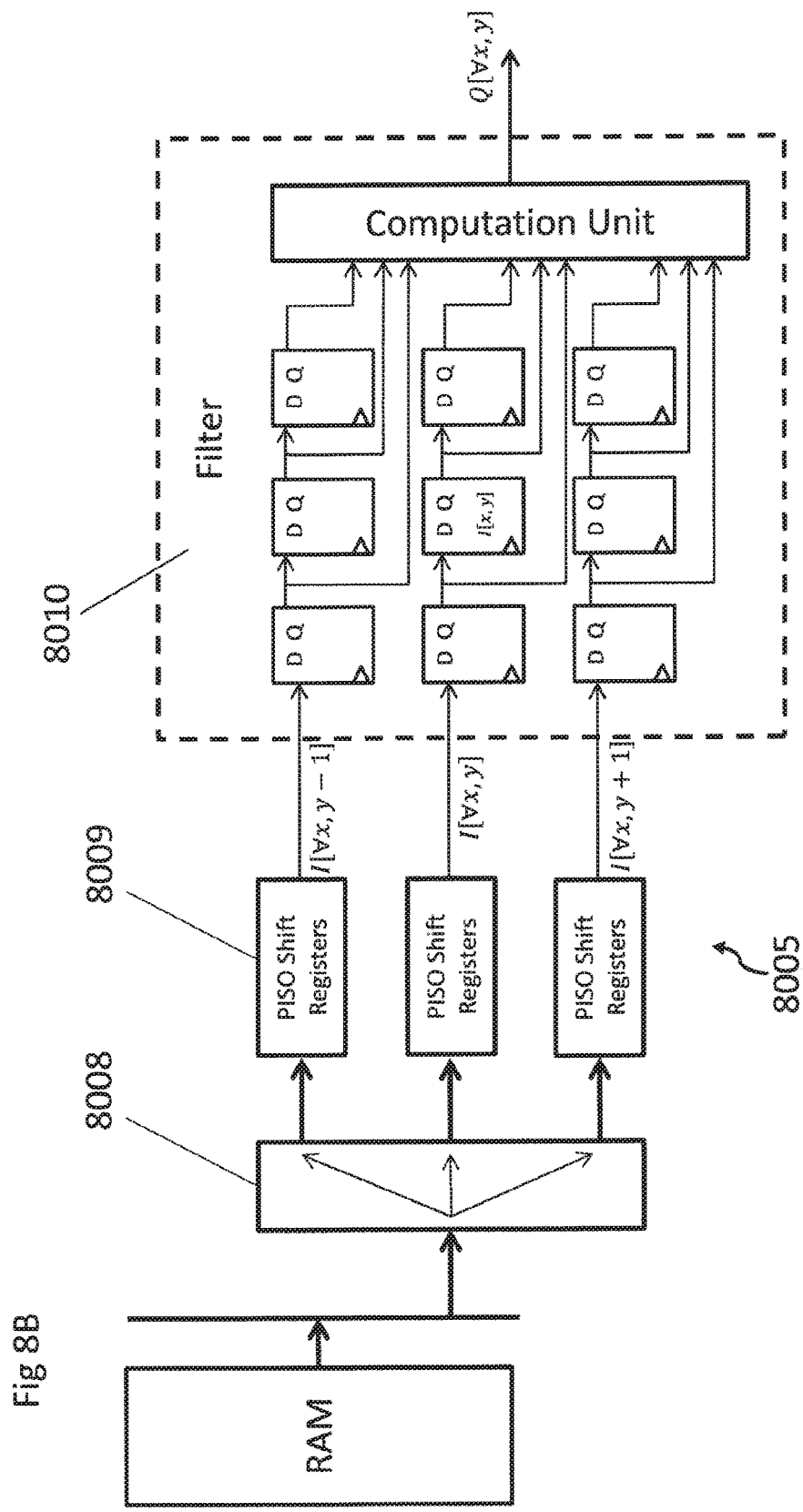

FIG. 8B shows a logical representation of the feature detection module 8005 of FIG. 8A. E.g. for a 64-bit bus, eight 8-bit pixels or two 32-Bit pixels can be input to the feature detection module each clock. Inside the feature detection module, there are three parallel-in-serial-out (PISO) shift registers 8009. One word of pixels (i.e. 8 greyscale 8-bit pixels for a 64-bit BUS) is input in parallel to one active shift registers and shifted to the window registers. One 64-bit word is transferred on the BUS from the RAM to the feature detection module. This equals to 8 greyscale 8-bit pixels. They are input to the appropriate parallel-in serial-out shift register. In the next clock the next 8 pixels are input to the net shift register. The shift registers shift one pixel per clock and are timed in a way that the three stacked pixels are input to the window registers. The shift registers 8009 shift one pixel each clock and output one pixel each clock. A control unit 8008 controls the flow to the shift registers. An alternate approach would be to input the data to ring-buffers. The filter 8010 has the same structure and functionality as the filter 7006, shown in FIG. 7B.

With at least some of the input coming from the RAM 8003, not only the storage size of the RAM 8003 is a limiting factor, but also the bandwidth on the bus 8004.

Figure 8C:
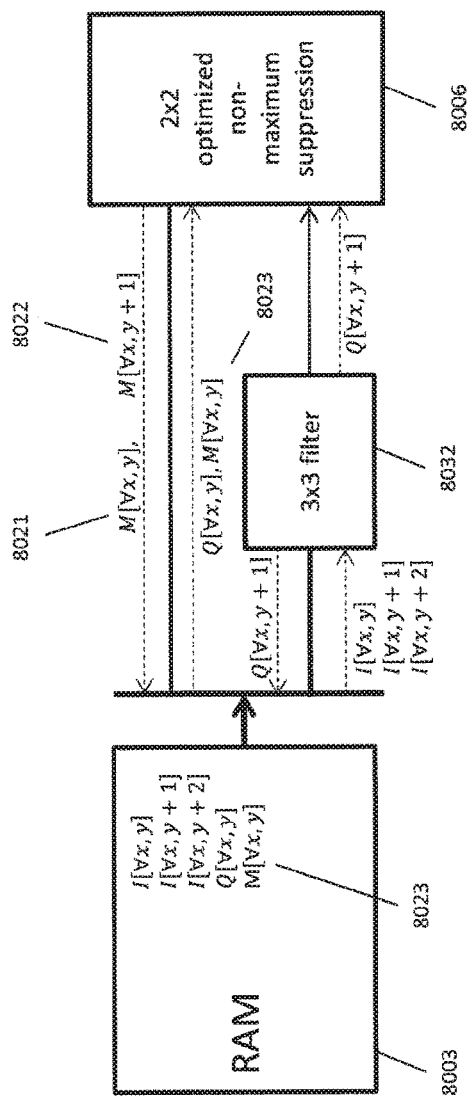
Figure 8D:
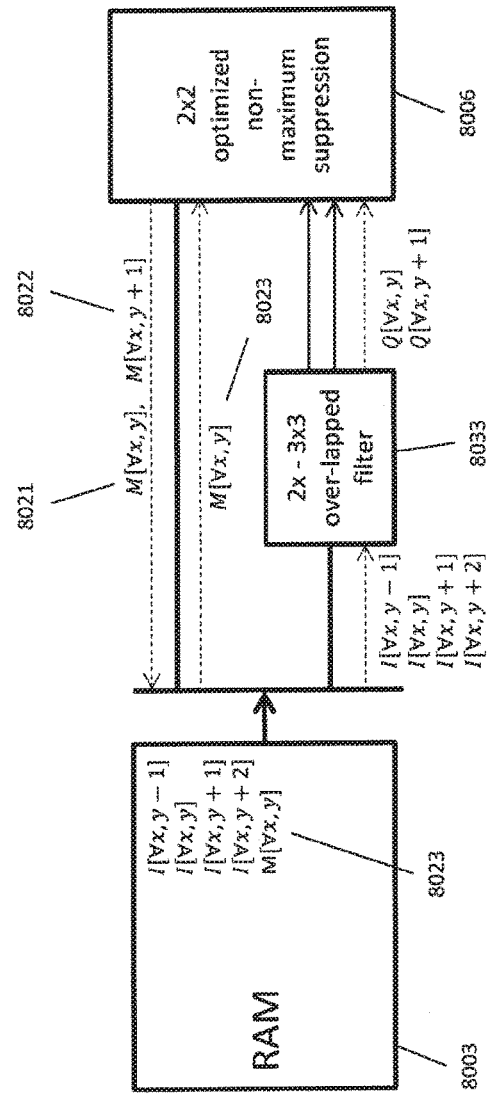

FIGS. 8C and 8D show two embodiments that are analogous to the embodiments of FIGS. 7C and 7D, but use the RAM/bus architecture described above. Now all the buffered lines are inside the RAM and have to be transferred over the bus. The solid lines in FIGS. 8C and 8D depict physical lines, while the dashed lines depict the data flow over the physical lines. The data stored in the RAM is written out to the respective blocks of FIGS. 8C and 8D. The memory savings discussed above with respect to FIGS. 7C and 7D result in analogous savings of bus bandwidth in the embodiments of FIGS. 8C and 8D. Accordingly, for one line of final indication output from the extremum determination module, the bus usage is reduced by 31*1920 bits, which corresponds to about 7 kBytes, as compared to a RAM/bus implementation using a prior art non-maximum suppression module (again calculated for the Full HD example of above). Such using of a prior art non-maximum suppression module would require 232320 bits or about 29 kBytes of data transfer via the bus while outputting one line of M[x,y] (three lines of I[x,y] would have to be transferred to the feature detection module, one line of Q[x,y] from the feature detection module to the RAM, two lines of Q[x,y] from the RAM to the extremum detection module and one line of M[x,y] from the extremum detection module to the RAM). The storage requirements in the RAM 8003 are reduced by the same amount.

An exemplary implementation of the dataflow for FIG. 8C is as follows:

input image data of three lines I[∀x,y], I[∀x,y+1] and I[∀x,y+2] from the RAM 8003 to the 3×3 filter-module 8032.

calculate the probability values Q[∀x,y+1] in the 3×3 filter-module 8032.

input the preliminary indications M[∀x,y] 8023 (known from previously calculations in the extremum determination module 8006 or set by default values) and the probability values Q[∀x,y] (known from previous calculations in the 3×3 filter-module 8032) from the RAM 8003 to the NMS-module 8006 input the probability values Q[∀x,y+1] from the 3×3 filter-module 8032 to the extremum determination module 8006 compute maximum indication values for the lines [∀x,y] and [∀x,y+1] in the extremum determination module 8006 output the maximum indication values (i.e. final indications M[∀x,y] 8021) for the line [∀x,y]

store the probability values Q[∀x,y+1] for the line [∀x,y+1] to the RAM 8003 store the maximum indication values (i.e. preliminary indications M[∀x,y+1] 8022) for the line [∀x,y+1] to the RAM 8003

For FIG. 8D, instead of loading Q[∀x,y] from the RAM 8003 to the extremum determination module 8006, it is calculated in the $2^{nd}$ 3×3 filter of the modified filter-module 8033.

The embodiment of FIG. 8D, which is in analogy to the embodiment of FIG. 7D, allows for a further reduction in bus bandwidth and RAM storage. The transferred data can in this way be reduced to 65280 bits or 8 kBytes of data for determining one line of final indications M[x,y].

As has been shown with respect to the exemplary embodiments of FIGS. 6 to 9 above, a prior art non-maximum suppression filter that relies on the processing of 3×3 pixel windows may be replaced by an extremum determination module that relies on processing overlapping 2×2 pixel windows. In the general case, a (2m+1)×(2n+1) window operation for non-maximum suppression may be reduced to (m+1)×(n+1) window operations. The comparison operations have to be performed on at least every non-border pixel. The reduced (m+1)×(n+1) windows for different comparison operations have a maximum overlap of m columns or n rows. Accordingly, a hardware implementation with a line-wise access pattern may have n probability value line buffers and (m+1)×(n+1) internal registers in the extremum determination module for storing the appropriate feature probability values Q[x,y]. Additionally, the hardware implementation may have n preliminary indication line buffers, having one bit per preliminary indication, and (m+1)×(n+1) local bit registers in the extremum determination module for storing the appropriate preliminary indication values M[x,y]. The feature probability values Q[x,y] and the preliminary indication values M[x,y] may travel through the extremum determination module in the following manner. The feature probability values and the preliminary indication values of the respective left registers of the bottom n rows may be output from the respective registers to the probability value and preliminary indication line buffers, stalled there and then input to the respective right registers of the top n rows. A final indication is output for the top left pixel of the (m+1)×(n+1) window, while a new preliminary indication is generated for the bottom right pixel of the (m+1)×(n+1) window.

In the developed local maximum detection for a pixel in question in a neighborhood with a (2m+1)×(2n+1) window operation, one comparison operation may be based on a (m+1)×(n+1) window (containing the pixel in question and a subset of neighboring pixels of the pixel in question).

In one implementation, after the comparison operation, a final indication value may be determined for the top left pixel of the (m+1)×(n+1) window, and indication values for (m+1)×n pixels of the bottom n rows of the (m+1)×(n+1) window may be saved as preliminary indications. At least part of the preliminary indications may be stored to n preliminary indication line buffers respectively.

In another implementation, after the comparison operation, indication values for n pixels of the left column of the bottom n rows (i.e. except for the top left pixel) of the (m+1)×(n+1) window may be saved as preliminary indications to n preliminary indication line buffers respectively. Indication values for m×(n+1) pixels of the right m columns of the (m+1)×(n+1) window may be saved as preliminary indications locally and used in the next immediate comparison.

The feature probability value for the top left pixel of the (m+1)×(n+1) window may be discarded after the comparison operation, while the feature probability value of the bottom right pixel of the (m+1)×(n+1) window represents the most recently acquired value from the image source. This scales for all values m and n with 2m<image width and 2n<image height.

EXPRESSIONS AND DEFINITIONS

Filter: After Bailey, D. "Design for Embedded Image Processing on FPGAs" Wiley, 2011, a local filter is an operation defined by "having the output be some function within a local neighborhood or window: Q[x,y]= f(I[x,y], . . . , I[x+Δx,y+Δy]), (Δx,Δy)□W, where W is the window or local neighborhood centered on I[x,y]". For more information on filtering, especially implemented in logic/on FPGAs, refer to Bailey, D. "Design for Embedded Image Processing on FPGAs" *Wiley*, 2011, chapter 8. The filters that are described in this document are all performed on each pixel of the image. Border cases are ignored.

Feature: A feature is an important part of an image. A feature is one pixel that has certain qualifications. Often corners are considered features. A filter may be used on the image to find features. Such a filter is called feature detector. For each pixel I[x,y], the filter calculates the probability Q[x,y] of the pixel being a feature.

FIFO: A First-In First-Out Buffer. Data is written into the FIFO and read out in the same order. A FIFO has a width which is the word size of an element and a depth which is the maximum number of elements in the FIFO.

Line/Row Buffer: The basic storage alignment for images is line-wise from left to right. The top left pixel has the lowest address. The following bytes are the pixels right of it. After the rightmost pixel of the top line was stored, the leftmost pixel of the $2^{nd}$ line is stored. To perform a filter on each pixel like in Bailey, D. "Design for Embedded Image Processing on FPGAs" *Wiley*, 2011, we need line buffers. These can be in form of a RAM outside or FIFOs integrated into the calculation module.

Hardware implementation: Implementation in gated logic on FPGA, hard wired logic, ASIC etc.

Image Source: The source of the image. Might be a device (digital camera, etc) or a memory. Outputs one pixel per clock. In this document, mostly greyscale intensity images are used. The described apparatus and method equally apply to color images or any other kind of image.

The invention claimed is:

1. An apparatus for detecting a feature in an image, the apparatus comprising:
one or more processors; and
a memory coupled to the one or more processors and comprising computer readable code executable by the one or more processors to:
receive at least part of an image in the form of image data comprising a plurality of non-border pixels of the image, wherein each non-border pixel is not located on any edge of the image;
associate a feature probability value to each non-border pixel, wherein the feature probability value indicates a probability that the pixel is at least part of a feature;
determine at least one local extremum among the feature probability values by comparing the feature probability value of a first non-border pixel with different subsets of neighboring pixels, where each neighboring pixel is directly adjacent to the non-border pixel; and
finally associate the determined local extremum with the feature.

2. The apparatus of claim 1, wherein comparing the feature probability value of a first non-border pixel with different subsets of neighboring pixels comprises:
comparing the feature probability value of the first non-border pixel with feature probability values of at least a first neighboring pixel but not all neighboring pixels, where the first neighboring pixel is directly adjacent to the non-border pixel.

3. The apparatus of claim 2, wherein comparing the feature probability value of a first non-border pixel with different subsets of neighboring pixels further comprises:
comparing the feature probability value of the first non-border pixel with the feature probability values of at least a second neighboring pixel but not all neighboring pixels, where the second neighboring pixel is directly adjacent to the non-border pixel and is not the same pixel as the first neighboring pixel.

4. The apparatus of claim 3, where, after comparing the first non-border pixel with feature probability values of at least a first neighboring pixel and comparing the first non-border pixel with feature probability values of at least a second neighboring pixel, the first non-border pixel has been compared with all of its neighboring pixels.

5. The apparatus of claim 1, wherein a plurality of the associated feature probability values are preliminary indications.

6. The apparatus of claim 5, wherein the preliminary indications are Boolean and are expressed with a single bit.

7. The apparatus of claim 1, where the local extremum is not finally associated with the feature until after all the non-border pixels in the at least part of the image have been evaluated.

8. The apparatus of claim 1, where the local extremum is not finally associated with the feature until after all the non-border pixels in the image have been evaluated.

9. A non-transitory program storage device comprising instructions stored thereon to cause one or more processors to:
receive at least part of an image in the form of image data comprising a plurality of non-border pixels of the image, wherein each non-border pixel is not located on any edge of the image;
associate a feature probability value to each non-border pixel, wherein the feature probability value indicates a probability that the pixel is at least part of a feature;
determine at least one local extremum among the feature probability values by comparing the feature probability value of a first non-border pixel with different subsets of neighboring pixels, where each neighboring pixel is directly adjacent to the non-border pixel; and
finally associate the determined local extremum with the feature.

10. The non-transitory program storage device of claim 9, wherein comparing the feature probability value of a first non-border pixel with different subsets of neighboring pixels comprises:
comparing the feature probability value of the first non-border pixel with feature probability values of at least a first neighboring pixel but not all neighboring pixels, where the first neighboring pixel is directly adjacent to the non-border pixel.

11. The non-transitory program storage device of claim 10, wherein comparing the feature probability value of a first non-border pixel with different subsets of neighboring pixels further comprises:
comparing the feature probability value of the first non-border pixel with the feature probability values of at least a second neighboring pixel but not all neighboring pixels, where the second neighboring pixel is directly adjacent to the non-border pixel and is not the same pixel as the first neighboring pixel.

12. The non-transitory program storage device of claim 11, where, after comparing the first non-border pixel with feature probability values of at least a first neighboring pixel and comparing the first non-border pixel with feature probability values of at least a second neighboring pixel, the first non-border pixel has been compared with all of its neighboring pixels.

13. The non-transitory program storage device of claim 9, wherein a plurality of the associated feature probability values are preliminary indications.

14. The non-transitory program storage device of claim 13, wherein the preliminary indications are Boolean and are expressed with a single bit.

15. The non-transitory program storage device of claim 9, where the local extremum is not finally associated with the feature until after all the non-border pixels in the at least part of the image have been evaluated.

16. The non-transitory program storage device of claim 9, where the local extremum is not finally associated with the feature until after all the non-border pixels in the image have been evaluated.

17. A method comprising:
  receiving at least part of an image in the form of image data comprising a plurality of non-border pixels of the image, wherein each non-border pixel is not located on any edge of the image;
  associating a feature probability value to each non-border pixel, wherein the feature probability value indicates a probability that the pixel is at least part of a feature;
  determining at least one local extremum among the feature probability values by comparing the feature probability value of a first non-border pixel with different subsets of neighboring pixels, where each neighboring pixel is directly adjacent to the non-border pixel; and
  finally associating the determined local extremum with the feature.

18. The method of claim 17, wherein comparing the feature probability value of a first non-border pixel with different subsets of neighboring pixels comprises:
  comparing the feature probability value of the first non-border pixel with feature probability values of at least a first neighboring pixel but not all neighboring pixels, where the first neighboring pixel is directly adjacent to the non-border pixel.

19. The method of claim 18, wherein comparing the feature probability value of a first non-border pixel with different subsets of neighboring pixels further comprises:
  comparing the feature probability value of the first non-border pixel with the feature probability values of at least a second neighboring pixel but not all neighboring pixels, where the second neighboring pixel is directly adjacent to the non-border pixel and is not the same pixel as the first neighboring pixel.

20. The method of claim 19, where, after comparing the first non-border pixel with feature probability values of at least a first neighboring pixel and comparing the first non-border pixel with feature probability values of at least a second neighboring pixel, the first non-border pixel has been compared with all of its neighboring pixels.

21. The method of claim 17, wherein a plurality of the associated feature probability values are preliminary indications.

22. The method of claim 21, wherein the preliminary indications are Boolean and are expressed with a single bit.

23. The method of claim 17, where the local extremum is not finally associated with the feature until after all the non-border pixels in the at least part of the image have been evaluated.

24. The method of claim 17, where the local extremum is not finally associated with the feature until after all the non-border pixels in the image have been evaluated.

* * * * *